(12) United States Patent
Kawamura et al.

(10) Patent No.: US 8,873,499 B2
(45) Date of Patent: Oct. 28, 2014

(54) USER APPARATUS, BASE STATION APPARATUS, AND METHOD

(71) Applicant: NTT DoCoMo, Inc., Tokyo (JP)

(72) Inventors: Teruo Kawamura, Yokosuka (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 14/015,712

(22) Filed: Aug. 30, 2013

(65) Prior Publication Data

US 2014/0003398 A1    Jan. 2, 2014

Related U.S. Application Data

(63) Continuation of application No. 12/443,941, filed as application No. PCT/JP2007/069197 on Oct. 1, 2007, now Pat. No. 8,565,166.

(30) Foreign Application Priority Data

Oct. 3, 2006 (JP) ................................. 2006-272352
Nov. 1, 2006 (JP) ................................. 2006-298313
Jan. 9, 2007 (JP) ................................. 2007-001855

(51) Int. Cl.

| | |
|---|---|
| H04W 4/00 | (2009.01) |
| H04J 11/00 | (2006.01) |
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 5/00 | (2006.01) |
| H04W 72/08 | (2009.01) |
| H04J 13/00 | (2011.01) |
| H04L 1/16 | (2006.01) |

(52) U.S. Cl.
CPC ............. *H04W 72/08* (2013.01); *H04L 5/0091* (2013.01); *H04L 5/0064* (2013.01); *H04L 1/0026* (2013.01); *H04L 5/006* (2013.01); *H04J 13/0059* (2013.01); *H04L 5/0053* (2013.01); *H04L 5/0007* (2013.01); *H04L 1/1671* (2013.01); *H04L 1/0081* (2013.01)
USPC ........... 370/329; 370/208; 370/209; 370/210; 370/231; 370/235; 370/281; 370/328

(58) Field of Classification Search
None
See application file for complete search history.

(56) References Cited

U.S. PATENT DOCUMENTS

2006/0274712 A1    12/2006  Malladi et al.
2007/0183386 A1*   8/2007   Muharemovic et al. ...... 370/344

(Continued)

FOREIGN PATENT DOCUMENTS

| JP | 07-322332 A | 12/1995 |
|---|---|---|
| JP | 2009-543528 T | 12/2009 |

(Continued)

OTHER PUBLICATIONS

International Search Report for PCT/JP2007/069197 mailed Dec. 25, 2007 (9 pages).

(Continued)

*Primary Examiner* — Faruk Hamza
*Assistant Examiner* — Diane Lo
(74) *Attorney, Agent, or Firm* — Osha Liang LLP

(57) ABSTRACT

A user apparatus generates an uplink control channel including at least one of acknowledgement information and channel condition information on a downlink, and transmits the uplink control channel in a predefined dedicated band if no resource is assigned to transmit an uplink data channel. The uplink control channel includes multiple unit block sequences resulting from multiplication of the same factor with all chips of a CAZAC code sequence for the user apparatus.

36 Claims, 18 Drawing Sheets

(56) References Cited

U.S. PATENT DOCUMENTS

| | | |
|---|---|---|
| 2008/0075195 A1 | 3/2008 | Pajukoski et al. |
| 2009/0303929 A1 | 12/2009 | Yamamoto et al. |

FOREIGN PATENT DOCUMENTS

| | | |
|---|---|---|
| WO | 2006069299 A1 | 6/2006 |
| WO | 2007087602 A2 | 8/2007 |
| WO | 2008006088 A2 | 1/2008 |
| WO | 2008036977 A2 | 3/2008 |
| WO | 2008038114 A2 | 4/2008 |
| WO | 2008053930 A1 | 5/2008 |

OTHER PUBLICATIONS

Written Opinion of ISA (JP) for PCT/JP2007/069197 (3 pages).
3GPP TSG RAN WG1 Meeting #46bis; R1-062742, Seoul, Korea, Oct. 9-13, 2006, Title: CDM-based Multiplexing Method of Multiple ACK/NACK and CQI for E-UTRA Uplink Source: NTT DoCoMo et al. pp. 1-6.
"Evolved UTRA Nobori Link ni Okeru Chokko CDMA o Mochiiru L1/L2 Seigyo Channel Tajuho", Author(s): Kenichi Higuchi et al., Source: The Institute of Electronics, Information and Communication Engineers Sogo Taikai Koen Ronbunshu 1, The Institute of Electronics, Information and Communication Engineers Aug. 29, 2007.
"Single Carrier FDMA O Mochiiru Evolved UTRA Nobori Link ni Okeru L1/L2 Seigyo Channel no Kosei", Author(s): Teruo Kawamura et al., Source: IEICE Technical Report, vol. 106, No. 305, The Institute of Electronics, Information and Communication Engineers, Oct. 12, 2006.
3GPP TSG-RAN WG1 Meeting #45; R1-061193, Shanghai, China, May 8-12, 2006, Title: "Multiplexing Method for Orthogonal Reference Signals for E-Utra Uplink", Source: NTT DoCoMo, May 12, 2006.
"Evolved UTRA Nobori Link ni Okeru L1/L2 Seigyo Channel Kosei no Kento", Author(s): Teruo Kawamura et al., Source: 2006 IEICE Communications Society Conference Koen Ronbunshu 1, The Institute of Electronics, Information and Communication Engineers, Sep. 7, 2006.
"Evolved UTRA Nobori Link ni Okeru L1/L2 Seigyo Channel Tajuho no Kento", Author(s): Hiroyuki Kawai et al., Source: 2006IEICE Communications Society Conference Koen Ronbunshu 1, The Institute of Electronics, Information and Communication Engineers, Sep. 7, 2006.
3GPP TSG RAN WG1 LTE Ad Hoc; R1-061675, Cannes, France, Jun. 27-30, 2006 Title: "Data-non-associated L1/L2 Control Channel Structure for E-UTRA Uplink" Source: NTT DoCoMo et al. pp. 1-6.
Japanese Office Action for Application No. 2007-001855, mailed on Mar. 16, 2010 (4 pages).
David C. Chu, "Polyphase Codes with Good Periodic Correlation Properties", IEEE Trans. Inform. Theory, vol. IT-18, pp. 531-532, Jul. 1972.
3GPP TSG RAN WG1 Ad Hoc on LTE, R1-050822, London, UK, Aug. 29-Sep. 2, 2005, Texas Instruments, "On Allocation of Uplink Pilot Sub-Channels in EUTRA SC-FDMA".
Office Action issued in related Japanese Patent Application No. 2007-001855; Dated Jun. 8, 2010 (5 pages).
3GPP TSG RAN WG1 #45, R1-061176, Shanghai, China, May 8-12, 2006, Motorola, "EUTRA SC-FDMA Uplink Pilot/Reference Signal Design & TP" (8 pages).
3GPP TSG RAN WG1 #45, R1-061623, Shanghai, China, May 8-12, 2006, Texas Instruments, "Uplink Pilot: Link and Systems Level Considerations & Text Proposal" (14 pages).
Japanese Office Action for Application No. 2007-001855, mailed on Aug. 24, 2010 (5 pages).
Extended European Search Report for Application No. 07828937.8, mailed on Nov. 4, 2011 (9 pages).
Kddi et al, "CDMA Based Multiplexing of ACK/NACK and CQI Control Information in E-UTRA Uplink" 3GPP TSG RAN WG1 Meeting #47, Riga, Vatvia, Nov. 6-10, 2006; R1-063579 (4 pages).
Japanese Office Action for Application No. 2010-111298, mailed on Apr. 10, 2012 (4 pages).
Japanese Office Action for Application No. 2010-236973, mailed on Apr. 10, 2012 (4 pages).
NTT Docomo, Ericsson, Fujitsu, KDDI, LG Electronics, Mitsubishi Electric, NEC, Panasonic, Sharp, Toshiba Corporation, "Multiplexing Method for Orthogonal Reference Signals for E-UTRA Uplink" 3GPP TSG RAN WG1 Meeting #46, R1-062101, Tallinn, Estonia, Aug. 28-Sep. 1, 2006 (13 pages).
Australian Office Action for Application No. 2007303287, mailed on Apr. 17, 2012 (4 pages).
Motorola, ,"E-UTRA Uplink Control Channel Design and TP" 3GPP TSG RAN1 #44, R1-060403, Denver, USA, Feb. 13-17, 2006.
Japanese Office Action for Application No. 2010-236973, mailed on Jul. 17, 2012 (7 pages).
Japanese Office Action for Application No. 2010-236973, mailed on Oct. 30, 2012 (4 pages).
Patent Abstracts of Japan for Japanese Publication No. 07-322332, publication date Dec. 8, 1995 (1 page).

* cited by examiner

USER APPARATUS, BASE STATION APPARATUS, AND METHOD

CROSS-REFERENCE TO RELATED APPLICATIONS

The present application is a continuation application of and, thereby, claims benefit under 35 U.S.C. §120 to U.S. patent application Ser. No. 12/443,941 filed on Apr. 1, 2009, titled, "USER APPARATUS, BASE STATION APPARATUS AND METHOD," which is a national stage application of PCT Application No. PCT/JP2007/069197, filed on Oct. 1, 2007, which claims priority to Japanese Patent Application No. JP2006-272352 filed on Oct. 3, 2006, Japanese Patent Application No. JP2006-298313 filed on Nov. 1, 2006, and Japanese Patent Application No. JP2007-001855 filed on Jan. 9, 2007. The contents of the priority applications are incorporated by reference in their entirety.

TECHNICAL FIELD

The present invention relates to the technical field of mobile communication and more particularly relates to user apparatuses, base station apparatuses and methods for use in mobile communication systems.

BACKGROUND ART

In this technical field, some research and development on next-generation communication systems have been intensively accelerated. In currently anticipated communication systems, a single-carrier scheme may be promising for use in uplinks from the viewpoint of wider coverage while avoiding increase in PAPR (peak-to-Average Power Ratio). Also in these communication systems, both uplink and downlink radio resources may be assigned in channels shared between multiple users depending on respective communication conditions of the users. Operations for determining such assignment may be referred to as scheduling. For appropriate scheduling in uplinks, each user apparatus transmits a pilot channel to a base station, and the base station evaluates channel condition of the uplinks based on reception quality. Also for scheduling in downlinks, the base station transmits a pilot channel to the user apparatus, and the user apparatus informs the base station of information (CQI: Channel Quality Indicator) indicative of channel conditions based on reception quality of the pilot channel. The base station evaluates the channel conditions of the downlinks based on the CQIs reported from the user apparatuses and accordingly schedules the downlinks.

Uplink control channels may include two types of control information, control information (requisite control information or first control information) that must be transmitted concomitantly to uplink data channels, and control information (second control information) that may be transmitted independent of the presence of the uplink data channels. The first control information may include information necessary to demodulate the data channels such as data channel modulation schemes and channel coding rates. The second control information may include downlink channel CQI information, downlink data channel acknowledgement information (ACK/NACK), resource assignment requests and/or others. Accordingly, the user apparatus may transmit only the first control information, only the second control information or both the first and second control information in the uplink control channels.

In the case where a resource block (radio resource) is assigned for transmission of the uplink data channel, the first control information (and the second control information as needed) may be transmitted in that resource block. On the other hand, if no uplink data channel is transmitted, it is assumed that the second control information is transmitted in a dedicated resource (dedicated band). Some examples of such band utilization are outlined below.

FIG. 1 illustrates exemplary uplink band utilization. In the illustrated example, two types of resource units of greater and smaller data sizes are provided. The larger resource unit may have a bandwidth $F_{RB1}$ of 1.25 MHz and a duration $T_{RB}$ of 0.5 ms. The smaller resource unit may have a bandwidth $F_{RB2}$ of 375 kHz and the duration $T_{RB}$ of 0.5 ms. The duration may be referred to as a unit transmission period, a transmission time interval (TTI) or a subframe. The duration may correspond to duration of a single radio packet. Six resources are arranged in the direction of frequency axis, and the smaller resources are arranged in the rightmost and leftmost locations. Various arrangement patterns of the resources can be designed as long as both the transmitter side and the receiver side have knowledge of them. In the illustrated example, uplinks are scheduled to transmit control channels (first control channels) being concomitant to uplink data channels together with the second control channels as needed in partial intervals in the larger resources (second, third, fourth and fifth resource blocks). Also in the smaller resources (first and sixth resources), transmission timings of user apparatuses are adjusted to transmit control channels (second control channels) for the case of no transmission of the uplink data channels. In addition, two smaller resources are used to transmit the first control channel for a certain user apparatus. In the illustrated example, the second control channel for user apparatus A is transmitted in the sixth resource in the second subframe and the first resource in the third subframe. Similarly, the second control channel for user apparatus B is transmitted in the sixth resource in the third subframe and the first resource in the fourth subframe. In this manner, the second control channels are transmitted such that they are hopped with respect to the frequency axis and the time axis. As a result, time and frequency diversities can be obtained, resulting in higher reliability of successful demodulation of the second control channels at the base station.

FIG. 2 illustrates another exemplary uplink band utilization. Similar to the example illustrated in FIG. 1, two types of resource units of greater and smaller data sizes are provided. In this example, the subframe duration $T_{RB}$ is subdivided into two subintervals for the smaller resources (first and sixth resources). In the illustrated example, the second control channel for user apparatus A is transmitted in the first subinterval (the first half of the subframe interval) of the first resource in the first subframe and in the second subinterval (the second half of the subframe interval) of the sixth resource in the first subframe. The second control channel for user apparatus B is transmitted in the first subinterval of the sixth resource in the first subframe and in the second subinterval of the first resource in the first subframe. The same transmission may be also performed in the third and fifth subframes. In this manner, the second control channels are transmitted so that they are hopped with respect to the frequency axis and the time axis. As a result, time and frequency diversities can be obtained, resulting in higher reliability of successful demodulation of the second control channels at the base station. In addition, the transmission of the control channel for user apparatus A may be completed within the single subframe, and the transmission of the control channel for user apparatus B may be also completed within the single subframe. Thus, this example may be preferred from the viewpoint of shorter transmission latency of the uplink control channels. This technique is described in non-patent document 1 "3GPP, R1-061675", for example.

DISCLOSURE OF INVENTION

Problem to be Solved by the Invention

In FIGS. 1 and 2, the smaller resources may be illustrated in such a manner that the whole resource may be occupied by user apparatus A or B as "CONTROL A" and "CONTROL B", but the resource may be shared between several user apparatuses from the viewpoint of efficient utilization of the resource. For example, it can be conceived that the several user apparatuses share a dedicated band in accordance with frequency division multiplexing (FDM) scheme. If the multiplexing is simply effected in the FDM scheme for the users, however, a smaller band can be occupied for each of the users, and thus a smaller number of chips can be included in the band (lower chip rate). As a result, a smaller number of orthogonal code sequences can be used in a pilot channel to differentiate the user apparatuses, which may increase interference levels. In addition, if it is accepted that a transmission bandwidth of an uplink control channel may vary frequently depending on the amount of user multiplexing and/or others, a base station must transmit modified transmission bandwidths to the user apparatuses for individual modifications. This may increase the amount of downlink control information (signaling overhead) and accordingly decrease transfer efficiency of data channels. Also, it can be conceived that resources in a dedicated band may be shared in accordance with a code division multiplexing (CDM) scheme as applied in W-CDMA based mobile communication systems. In the CDM scheme, a wider band can be occupied by a single user. However, interference power level may become higher, resulting in degraded signal quality. If the same user multiplexes and transmits acknowledgement information (ACK/NACK) and channel condition information (CQI) in accordance with the CDM scheme, there may be a risk of increase in peak power.

One object of the present invention is to obtain a larger number of orthogonal code sequences and reduce variations of transmission bands in multiplexing of uplink control channels from multiple user apparatuses in the case where the uplink control channels including at least one of acknowledgement information (ACK/NACK) for downlink data channels and information (CQI) indicative of downlink channel conditions are transmitted from the user apparatuses in accordance with the single-carrier scheme.

Means for Solving the Problem

The present invention is applied to a user apparatus for transmitting at least an uplink control channel to a base station apparatus in accordance with a single-carrier scheme. The user apparatus includes an acknowledgement information generation unit configured to generate acknowledgement information indicative of a positive response or a negative response to a downlink data channel, a channel condition generation unit configured to generate channel condition information indicative of a downlink channel condition, a control channel generation unit configured to generate an uplink control channel including at least one of the acknowledgement information and the channel condition information, and a transmission unit configured to transmit the uplink control channel in a predefined dedicated band if no resource is assigned to transmit an uplink data channel. The uplink control channel includes one or more unit blocks including a sequence resulting from multiplication of a uniform factor with all chips of an orthogonal code sequence for the user apparatus.

Advantage of the Invention

According to the embodiments of the present invention, it is possible to obtain a larger number of orthogonal code sequences and reduce variations of transmission bands in multiplexing of uplink control channels from multiple user apparatuses in the case where the uplink control channels including at least one of acknowledgement information (ACK/NACK) for downlink data channels and information (CQI) indicative of downlink channel condition are transmitted from the user apparatuses in accordance with the single-carrier scheme.

LIST OF REFERENCE SYMBOLS

Figure 1:
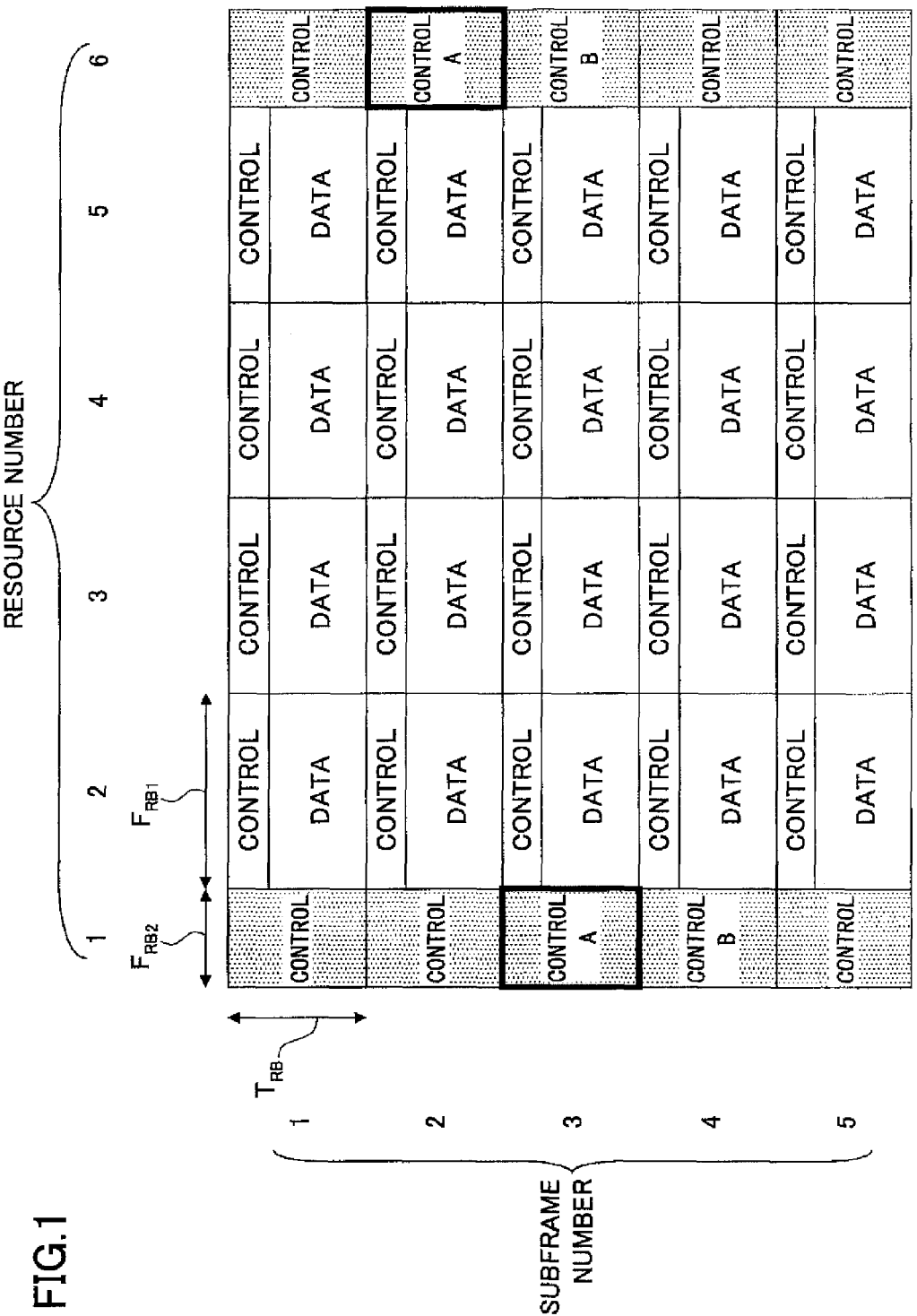
FIG. 1 illustrates exemplary band assignment for use in a mobile communication system.
Figure 2:
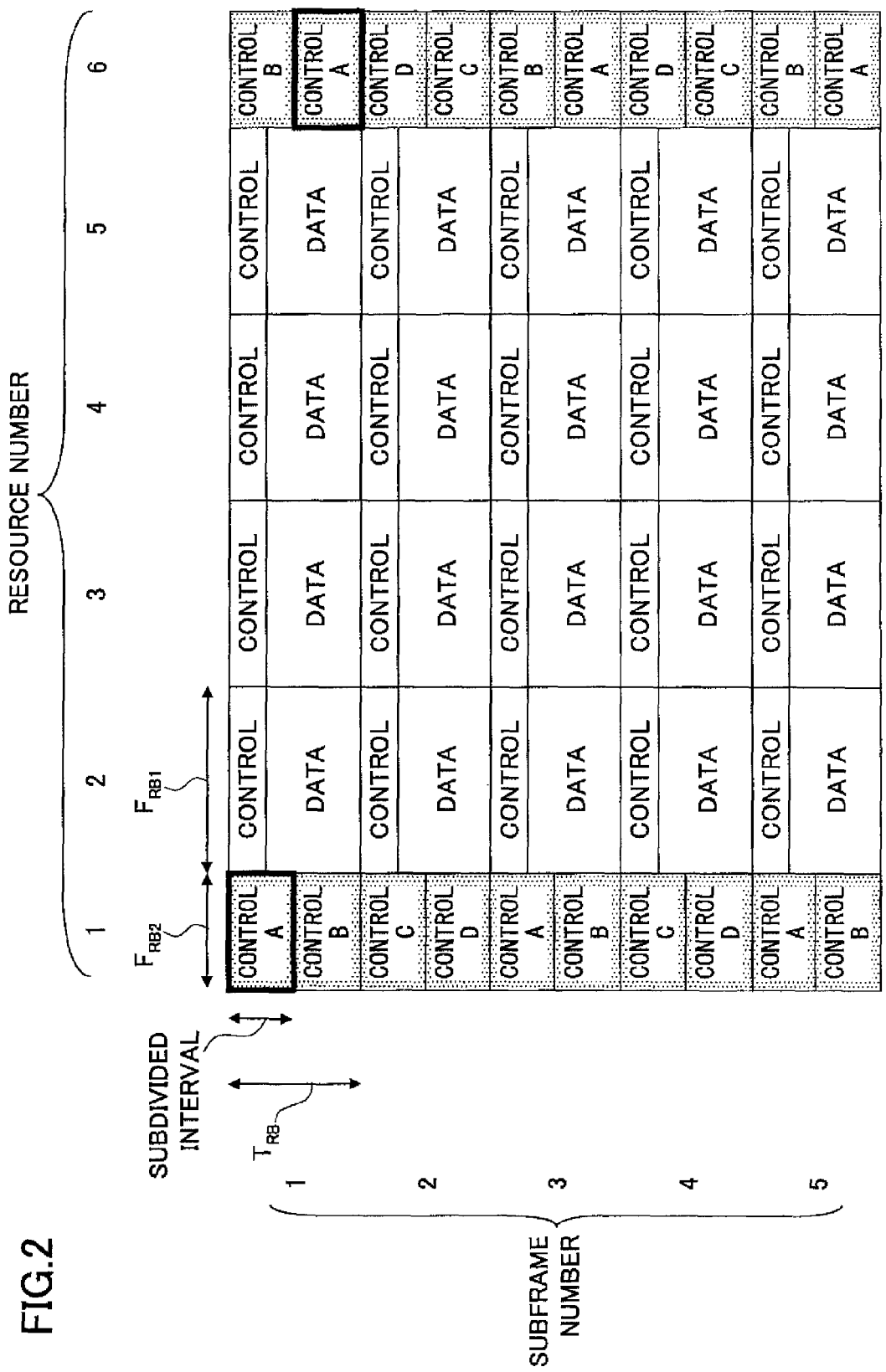
FIG. 2 illustrates another exemplary band assignment for use in a mobile communication system.

302: CQI estimation unit
304: ACK/NACK determination unit
306: block-wise modulation pattern generation unit
308: block-wise modulation unit
310: discrete Fourier transform (DFT) unit
312: subcarrier mapping unit
314: inverse fast Fourier transform (IFFT) unit
316: cyclic prefix (CP) application unit
318: multiplexing unit
320: RF transmission circuit
322: power amplifier
324: duplexer
330: code information identification unit
332: CAZAC code generation unit
334: cyclic shift unit
335: block spreading unit
336: frequency setting unit
338: pilot signal generation unit
340: transmission data sequence generation unit
702: duplexer
704: RF reception circuit
706: reception timing estimation unit
708: fast Fourier transform (FFT) unit
710: channel estimation unit
712: subcarrier demapping unit
714: frequency domain equalization unit
716: inverse discrete Fourier transform (IDFT) unit
718: demodulation unit
720: retransmission control unit
722: scheduler
724: code information setting unit

BEST MODE FOR CARRYING OUT THE INVENTION

According to one aspect of the present invention, an uplink control channel including at least one of acknowledgement information and channel condition information is transmitted in a predefined dedicated band if no resource is assigned to transmit an uplink data channel. The uplink control channel includes several unit block sequences (long blocks) resulting from multiplication of the same factor with all chips of an orthogonal code sequence (typically, a CAZAC code sequence) for a user apparatus. Thus, if the base station apparatus processes uplink control channels supplied from multiple user apparatuses on a per unit block sequence, the base station apparatus can separate the user apparatuses appropriately without orthogonality among the user apparatuses. Since the acknowledgement information or the channel condition information may have a relatively small amount of information, they can be fully represented in one or more factors multiplied with a CAZAC code.

According to one aspect of the present invention, an uplink control channel being not concomitant to an uplink data channel may include a CAZAC code sequence resulting from a number of iterations corresponding to the number of long blocks as well as some multiplier factors and a pilot channel generated from the CAZAC code sequence. Thus, as long as the base station apparatus processes the uplink control channel on a per long block basis or on a per short block basis, characteristics of the CAZAC code sequence would not be lost. This means that good orthogonality separation characteristics among user apparatuses is not only achieved but also the CAZAC codes for long blocks can be used as reference signals for channel estimation, path search and/or others.

Since not only a small number of short blocks including pilot channels but also a large number of long blocks included in uplink control channels are used for the channel estimation and/or others, it is possible to significantly improve the accuracy of the channel estimation and/or the path search.

According to one aspect of the present invention, uplink control channels from a large number of user apparatuses may be multiplexed in accordance with a code division multiplexing (CDM) scheme or a frequency division multiplexing (FDM) scheme with CAZAC codes, but the CDM scheme is provided with higher priority. For this reason, transmission bands of user apparatuses have to be modified as little as possible. Under the FDM scheme in this case, a band may have to be divided less narrowly than 1/(user multiplexing order). As a result, a larger number of code sequences for differentiating user apparatuses can be obtained while maintaining relatively wider transmission bands for uplink control channels. A smaller number of band types have to be provided in the FDM scheme, resulting in prevention of frequent modifications of the transmission bands. Another reason of preventing frequent modifications of the transmission bandwidth is that even if the transmission bandwidths of uplink control channels are frequently modified, it would be hard to significantly improve signal quality due to relatively smaller sizes of the acknowledgement information (ACK/NACK) and the channel condition information (CQI). Rather, it would be better to reduce overhead through infrequent modifications of the transmission bandwidths and focus on transmission power control for the signal quality.

According to one aspect of the present invention, an orthogonal code sequence may be represented in a set of factors (block spreading codes) multiplied with multiple unit blocks having the same contents. The unit block may include a sequence resulting from multiplication of the same factor (a factor provided separately from the block spreading codes) with all chips of the orthogonal code sequence. The use of block spreading codes can further increase possible code multiplexing orders. Thereby, the effect of preventing frequent modifications of the transmission bands due to increase or decrease in user multiplexing orders can be further enhanced.

First Embodiment

Figure 3:
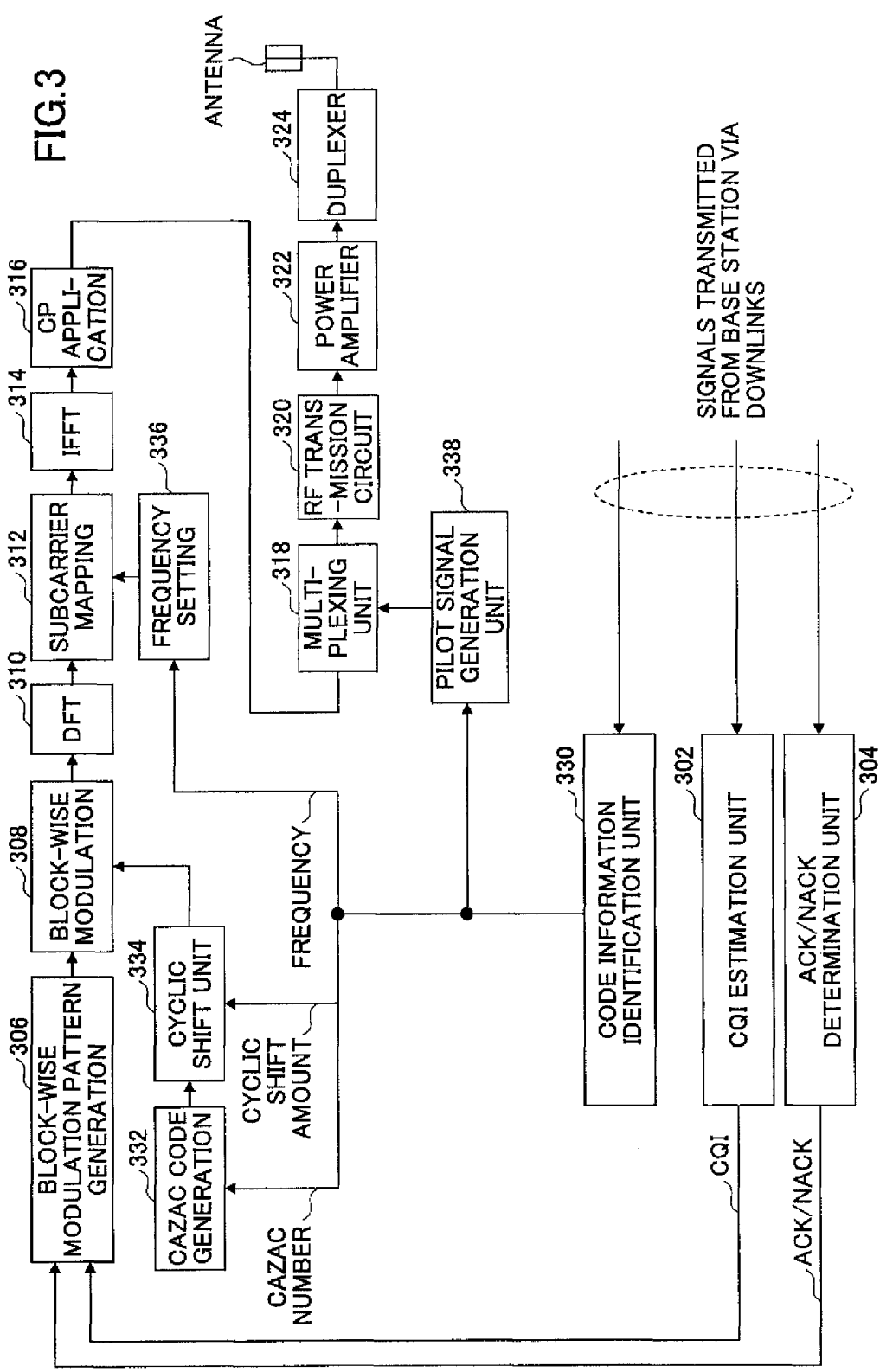
FIG. 3 is a block diagram illustrating a user apparatus according to one embodiment of the present invention.

FIG. 3 is a block diagram illustrating a user apparatus according to one embodiment of the present invention. In FIG. 3, a CQI estimation unit 302, an ACK/NACK determination unit 304, a block-wise modulation pattern generation unit 306, a block-wise modulation unit 308, a discrete Fourier transform (DFT) unit 310, a subcarrier mapping unit 312, an inverse fast Fourier transform (IFFT) unit 314, a cyclic prefix (CP) application unit 316, a multiplexing unit 318, a RF transmission circuit 320, a power amplifier 322, a duplexer 324, a code information identification unit 330, a CAZAC code generation unit 332, a cyclic shift unit 334, a frequency setting unit 336 and a pilot signal generation unit 338 are illustrated.

The CQI estimation unit 302 measures and supplies a measure indicative of downlink channel condition, that is, a channel quality indicator (CQI). The CQI may be derived, for example, by measuring reception quality (which may be represented as SIR, SINR or others) of a pilot channel transmitted from a base station and converting the measured reception quality into a numerical value. For example, the measured reception quality (SIR) may be converted into a numerical value indicating which one in 32 levels the reception quality is classified into and may be accordingly derived as a CQI represented in form of 5 bits.

The ACK/NACK determination unit 304 determines whether each packet in a received downlink data channel includes an error and supplies the determination result as acknowledgment information. The acknowledge information may be represented as either acknowledgement (ACK) indicating that the packet has no error or non-acknowledgement (NACK) indicating that the packet has an error. The acknowledgement information has only to represent the presence of an error in the received packet. Accordingly, the acknowledgement information can be represented in one bit but may be represented in more than one bit.

The block-wise modulation pattern generation unit 306 generates block-wise modulation patterns from the CQI and the acknowledgement information (ACK/NACK). A predefined number of blocks are included in a subframe, and in turn several subframes may constitute a transmission time interval (TTI) serving as a resource assignment unit.

Figure 4:
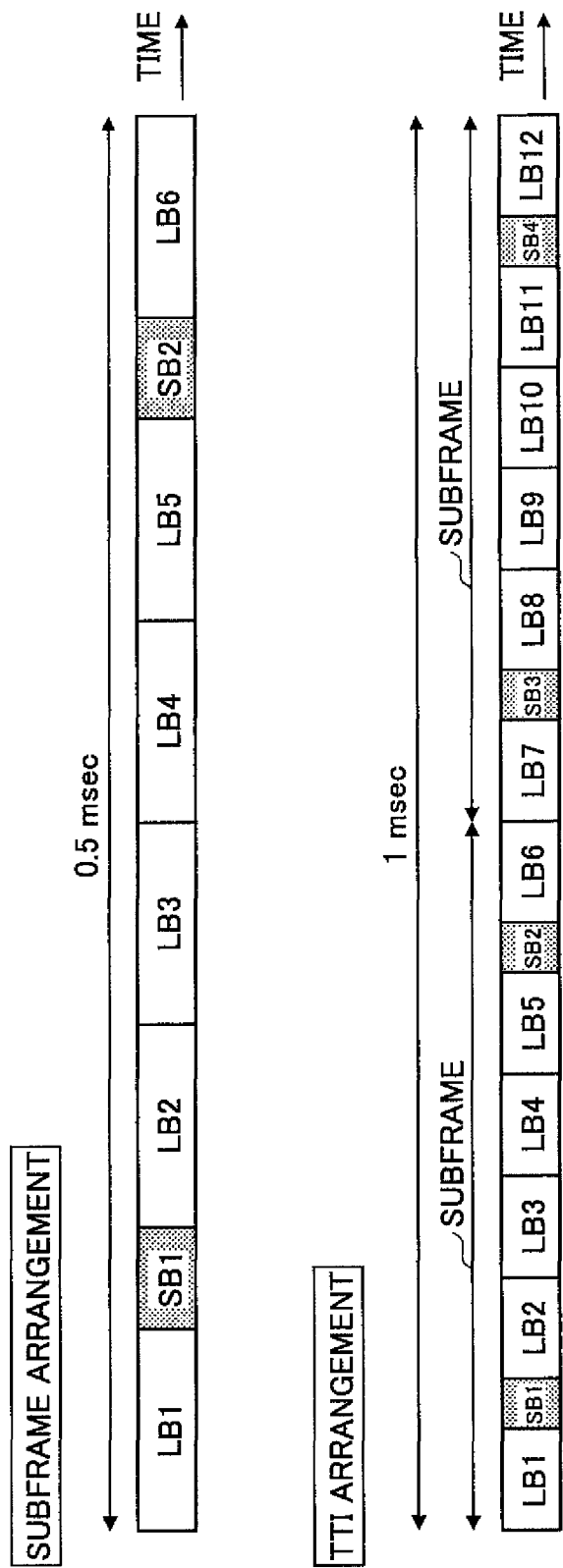
FIG. 4 illustrates exemplary arrangements of a TTI, sub-frames and blocks.

FIG. 4 illustrates exemplary arrangements of a TTI, subframes and blocks. In this illustration, the TTI of 1.0 ms includes two subframes of 0.5 ms, and each of the subframes includes six long blocks (LBs) and two short blocks (SBs). For example, the long block may have a duration of 66.7 μs, and the short block may have a duration of 33.3 μs. These numerical values are simply illustrative and can be modified as needed. In general, the long block is used to transmit data (control channels, data channels or others) unknown at the receiver side, and the short block is used to transmit data (pilot channels or others) known at the receiver side. In the illustrated example, one TTI is configured to have twelve long blocks (LB1-LB12) and four short blocks (SB1-SB4).

The block-wise modulation pattern generation unit 306 in FIG. 3 determines correspondence between one or more of the twelve long blocks (LB1-LB12) and bits for representing the CQI and correspondence between one or more of the twelve long blocks (LB1-LB12) and bits for representing the acknowledgement information (ACK/NACK). The user apparatus has several cases of transmission in uplink control channels, that is, a case of transmission of only the CQI, a case of transmission of only the acknowledgement information (ACK/NACK), and a case of transmission of both the CQI and the acknowledgement information. Thus, (A) all the twelve blocks may be associated with the CQI, (B) all the twelve blocks may be associated with the acknowledgement information, and/or (C) some of the twelve blocks mat be associated with the CQI and the others may be associated with the acknowledgement information. Even in any of the cases, one factor is provided in each of the twelve blocks, and a total of twelve factors (first through twelfth factors) are provided in one TTI.

Figure 5:
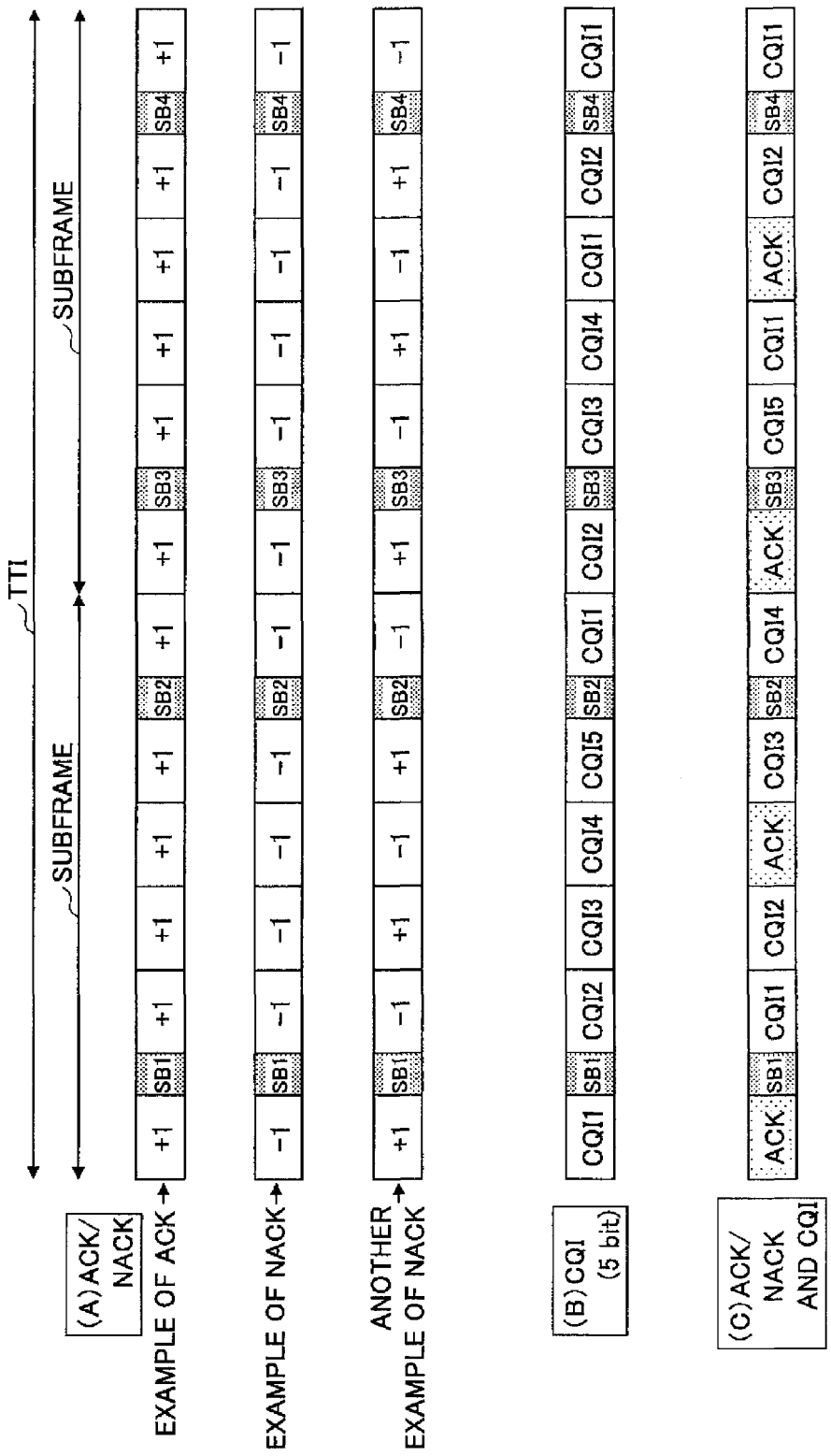
FIG. 5 illustrates exemplary arrangements of factors multiplied in long blocks LBs.

FIG. 5 illustrates exemplary arrangements of factors associated with long blocks (LBs). In the illustrated (A), only the acknowledgement information (ACK/NACK) is transmitted. In one embodiment, "1"s are assigned to all the twelve factors for positive acknowledgement (ACK), and "−1"s are assigned to all the twelve factors for negative acknowledgement (NACK). In FIG. 5, a combination of factors "1"s and "−1"s is illustrated for another example of the negative acknowledgement (NACK). These specific values for the factors are simply illustrative, and any other values for the factors can be used as long as the twelve factors for the positive acknowledgement are differentiated in total from the twelve factors for the negative acknowledgement. Also, the acknowledgement information does not have to be represented in the twelve factors and can be represented in one or more factors.

In some embodiments, ACK/NACK may be differentiated from each other in one factor. In other embodiments, ACK/NACK may be differentiated from each other in two factors such as (+1, +1) and (+1, −1). In other embodiments, ACK/NACK may be differentiated from each other in more than two factors. It may be the easiest determination that one factor is used to differentiate between ACK and NACK. From the viewpoint of improved determination precision, phase change of multiple factors is preferably used to differentiate between ACK and NACK. Further, the factors are not limited to "+1" and "−1" and may be any other complex numbers. Note that the factors "+1" and "−1" are advantageous in that simple sign inversion is enabled. This is why the same factor can be multiplied with all chips of a certain CAZAC code sequence as described below.

In the case where a base station has misidentified ACK as NACK, an unnecessary packet may be potentially retransmitted to the user apparatus. On the other hand, in the case where the base station has misidentified NACK as ACK, the user apparatus potentially cannot receive a packet necessary for packet combination, which may lead to packet loss and/or degrade quality significantly through the improper packet combination of new packets. Therefore, ACK/NACK patterns as represented in one or more factors are preferably set to prevent more significant misidentification of NACK as ACK.

In the illustrated (B), only the CQI is transmitted. In the illustration, the CQI is represented in five bits, and it is assumed that the individual bits are represented as CQI1, CQI2, CQI3, CQI4 and CQI5 in descending order from the upper bit. One long block is associated with any bit of the five bits. In other words, a factor for each of the twelve blocks may be any of the CQI1 through CQI5. In the illustration, one TTI is designed to transmit upper bits more times than or equal to lower bits. The most significant bit CQI1 is assigned to four blocks, CQI2 is assigned to three blocks, CQI3 is assigned to two blocks, CQI4 is also assigned to two blocks, and the lowest significant bit CQI5 is assigned to one block. In this manner, even if some errors occur, the CQI values can be prevented from varying drastically.

In the illustrated (C), the acknowledgement information (ACK/NACK) and the CQI are transmitted in the same TTI from the same user. In the illustration, three blocks are associated with the acknowledgement information (ACK/NACK), and the remaining nine blocks are associated with the CQI. Even in the case where the same user transmits the acknowledgement information (ACK/NACK) and the CQI, if several TTIs are available, the schemes (A) and (B) may be used. Also, when the channel condition becomes worse, for example, when a user moves from the cell center to the cell edge, the user may stop reporting the CQI and supply only feedback of ACK/NACK. Information items to be transmitted in uplink control channels may be modified as needed, for example, through signaling from an upper layer.

In this manner, the block-wise modulation pattern generation unit 306 in FIG. 3 provides one factor for each of the twelve blocks and accordingly provides twelve factors (first factor through twelfth factor) in total for one TTI.

The block-wise modulation unit 30B in FIG. 3 multiplies the first factor with all chips of a CAZAC code sequence (whose length can be associated with the length of one long block) assigned to the user apparatus to arrange the first long block, multiplies the second factor with all chips of the same CAZAC code sequence to arrange the second long block, and so on. Similarly, the block-wise modulation unit 308 arranges the twelfth long block by multiplying the twelfth factor with all chips of the same CAZAC code sequence and finally derives an informational sequence transmitted in one TTI.

The CAZAC code sequence commonly used for all the blocks is an orthogonal code sequence assigned in a residing cell to identify the user apparatus, and some characteristics are described below.

The discrete Fourier transform (DFT) unit 310 performs discrete Fourier transform to convert time-series information into frequency domain information.

The subcarrier mapping unit 312 performs mapping in the frequency domains. In particular, if a frequency division multiplexing (FDM) scheme is used to multiplex multiple user apparatuses, the subcarrier mapping unit 312 maps signals to a band assigned in the frequency setting unit 336. The FDM scheme includes two types of FDM schemes, that is, a localized FDM scheme and a distributed FDM scheme. In the localized FDM scheme, successive bands on the frequency axis are assigned to an individual user. In the distributed FDM scheme, downlink signals are generated to have multiple discontinuous frequency components distributed across a wide band (a dedicated band $F_{RB2}$ to uplink control channels).

The inverse fast Fourier transform (IFFT) unit 314 performs inverse Fourier transform to inversely convert frequency domain signals into time domain signals.

The cyclic prefix (CP) application unit 316 applies a cyclic prefix (CP) to information to be transmitted. The cyclic prefix (CP) serves as a guard interval to absorb multipath propagation delay and some differences of reception timings between several users at a base station.

The multiplexing unit 318 multiplexes the information into a pilot channel to generate transmission symbols. The pilot channel is transmitted in short blocks (SB1, SB2) illustrated as the frame configuration in FIG. 4.

The RF transmission circuit 320 performs digital-analog conversion, frequency conversion, band limiting and/or others to transmit the transmission symbols in a radio frequency.

The power amplifier 322 adjusts transmission power.

The duplexer 324 splits into transmission signals and reception signals for simultaneous communication.

The code information identification unit 330 identifies code information including a CAZAC code sequence (sequence number) for use in the user apparatus, a cyclic shift amount of the CAZAC code sequence and transmission band related information. The code information may be derived from broadcast information supplied via broadcast channels or transmitted from a base station separately. Such separate transmission may be performed through signaling from an upper layer such as a L3 control channel. As described in the second embodiment below, the code information identification unit 330 determines which orthogonal code sequence is represented by a set of factors (block spreading code) multiplied with multiple blocks.

The CAZAC code generation unit 332 generates a CAZAC code sequence in accordance with a sequence number specified in the code information.

The cyclic shift unit 334 derives other codes by rearranging the CAZAC code sequence in a cyclic manner in accordance with the cyclic shift amount specified in the code information.

CAZAC codes are overviewed below.

Figure 6:
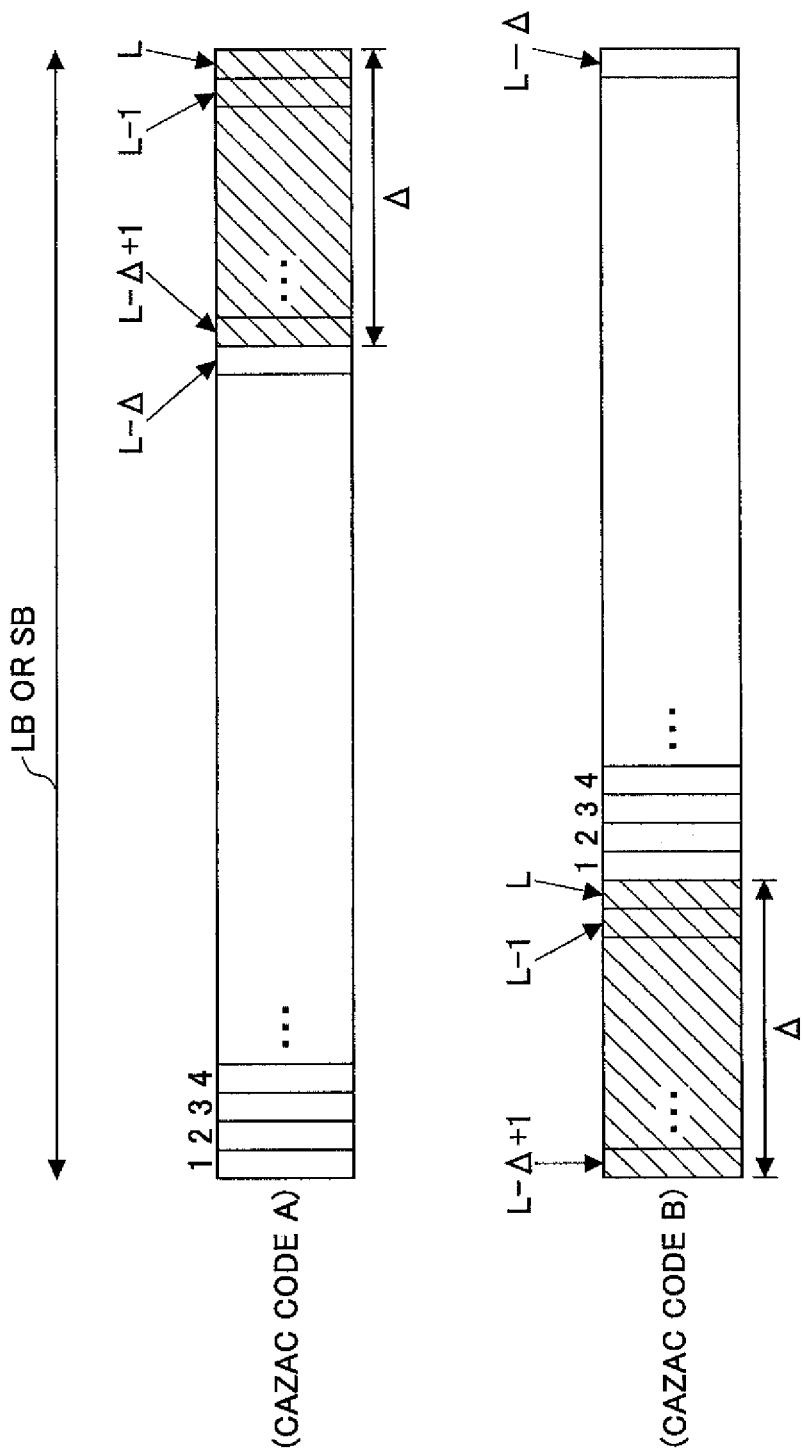
FIG. 6 is a diagram schematically illustrating characteristics of CAZAC codes.

As illustrated in FIG. 6, it is assumed that a certain CAZAC code A has L in code length. For convenience, it is assumed that the code length corresponds to a duration of L samples or L chips, but this assumption is not essential to the present invention. A sequence of Δ samples (illustrated in a shaded portion) including an end or L-th sample of a CAZAC code A is shifted to the head of the CAZAC code A, resulting in another code B as illustrated in the lower portion of FIG. 6. In this case, the CAZAC codes A and B are mutually orthogonal with respect to Δ (Δ=0, . . . , (L−1)). In other words, a certain CAZAC code and a code resulting from cyclical shift of that CAZAC code will be mutually orthogonal. Thus, if one CAZAC code sequence of the code length L is provided, a set of L mutually orthogonal codes can be theoretically provided. A certain CAZAC code A is not orthogonal to another CAZAC code C that cannot be obtained through cyclic shift of the CAZAC code A. However, the cross-correlation value between the CAZAC code A and a random code not being any CAZAC code may be significantly greater than that between the CAZAC code A and the CAZAC code C. Thus, the CAZAC code may be preferred from the viewpoint of reduction in the cross-correlation (interference) between codes being not mutually orthogonal.

In this embodiment, each user apparatus uses a CAZAC code selected among a set of CAZAC codes having the above-mentioned characteristic, that is, a set of code sequences derived by cyclically shifting a certain CAZAC code. In this embodiment, $L/L_A$ codes obtained by cyclically shifting a basic CAZAC code in a set of mutually orthogonal codes by Δ (Δ=n×$L_A$ and n=0, 1, . . . , (L−1)/$L_A$) are actually used as a pilot channel of a mobile station. The value of $L_A$ is determined based on the amount of multipath propagation delay. In this manner, uplink control channels transmitted from individual user apparatuses can properly maintain mutual orthogonality relationship even under multipath propagation environments. The CAZAC codes are described in detail in D. C. Chu, "Polyphase codes with good periodic correlation properties", IEEE Trans. Inform. Theory, vol. IT-18, pp. 531-532, July 1972; 3GPP, R1-050822, and Texas Instruments, "On allocation of uplink sub-channels in EUTRA SC-FDMA", for example.

The frequency setting unit 336 in FIG. 3 indicates which frequency each user apparatus uses if the FDM scheme is applied to uplink control channels from multiple user apparatuses.

The pilot signal generation unit 338 supplies a pilot channel to be included in an uplink control channel. As mentioned above, the pilot channel is transmitted in short blocks (SB1, SB2) illustrated in the frame configuration in FIG. 4. The pilot channel is also arranged in any CAZAC code assigned to each user apparatus. The CAZAC code for the pilot channel may be specified by a sequence number and a cyclic shift amount. In general, the long block and the short block have different lengths, different durations or different numbers of chips, and thus a CAZAC code $C_L$ in the long block (LB) and a CAZAC code $C_S$ in the short block may be separately provided. Note that the same user apparatus uses both the short block and the long block, there may be some relationship between the CAZAC codes $C_L$ and $C_S$. For example, a portion of the $C_L$ may be included in the $C_S$.

Figure 7:
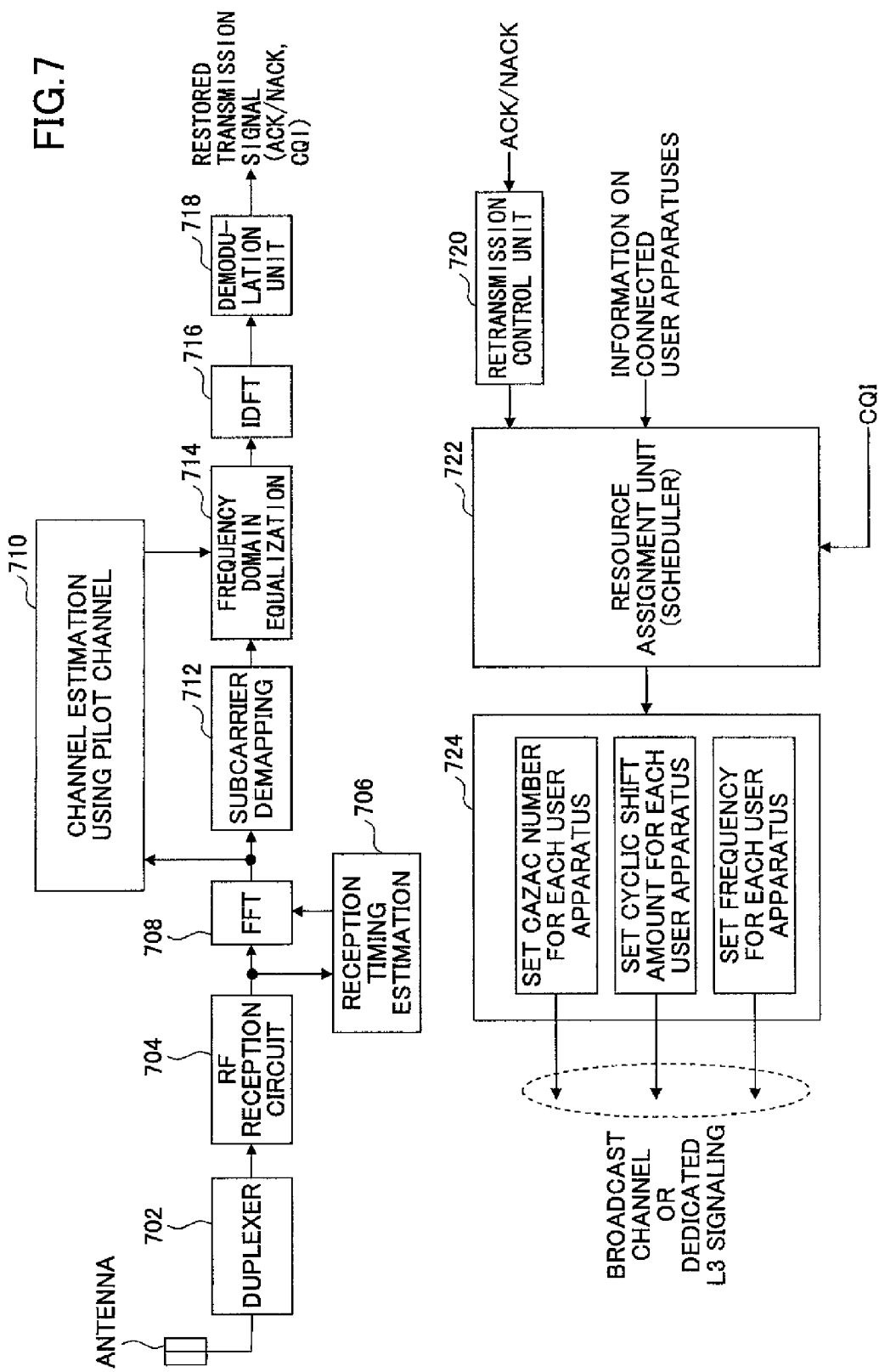
FIG. 7 is a block diagram illustrating an exemplary base station apparatus according to one embodiment of the present invention.

FIG. 7 illustrates a base station apparatus according to one embodiment of the present invention. In FIG. 7 a duplexer 702, a RF reception circuit 704, a reception timing estimation unit 706, a fast Fourier transform (FFT) unit 708, a channel estimation unit 710, a subcarrier demapping unit 712, a frequency domain equalization unit 714, an inverse discrete Fourier transform (IDFT) unit 716, a demodulation unit 718, a retransmission control unit 720, a scheduler 722 and a code information setting unit 724 are illustrated.

The duplexer 702 splits into transmission signals and reception signals for simultaneous communication.

The RF reception circuit 704 performs digital-analog conversion, frequency conversion, band limiting and/or others for processing reception symbols in a baseband.

The reception timing estimation unit 706 identifies a reception timing based on a synchronization channel or a pilot channel in a reception signal.

The fast Fourier transform (FFT) unit 708 performs Fourier transform and converts time-series information into frequency domain information.

The channel estimation unit 710 estimates uplink channel condition based on reception condition of an uplink pilot channel and supplies information for channel compensation.

The subcarrier demapping unit 712 performs demapping in frequency domains. This operation is performed corresponding to mapping in the frequency domains performed by individual user apparatuses.

The frequency domain equalization unit 714 performs equalization on reception signals based on channel estimation values.

The inverse discrete Fourier transform (TAFT) unit 716 performs inverse Fourier transform for conversion of the frequency domain signals into time domain signals.

The demodulation unit 71B demodulates reception signals. In this embodiment, uplink control channels are demodulated, and the CQI for downlink channels and/or acknowledgement information (ACK/NACK) to downlink data channels are supplied.

The retransmission control unit 720 provides a new packet or a retransmission packet corresponding to the acknowledgement information (ACK/NACK).

The scheduler 722 determines assignment of downlink resources based on the CQI for downlinks and/or other criteria. Also, the scheduler 722 determines assignment of uplink resources based on reception results of pilot channels transmitted from user apparatuses and/or other criteria. The determined assignment is supplied as scheduling information. The scheduling information specifies a frequency, a duration, a transmission format (data modulation scheme, channel coding rate and/or others) for signal transmission.

Based on the assignment determined by the scheduler 722, the code information setting unit 724 specifies code information including a sequence number indicative of an uplink CAZAC code for use in a user apparatus, a cyclic shift amount, an available frequency band and/or others. The code information may be commonly transmitted to the user apparatuses via broadcast channels or indicated individually to the user apparatuses. In the former case, it is required that each user apparatus can uniquely derive the code information for the user apparatus itself from the broadcast information.

Figure 8:
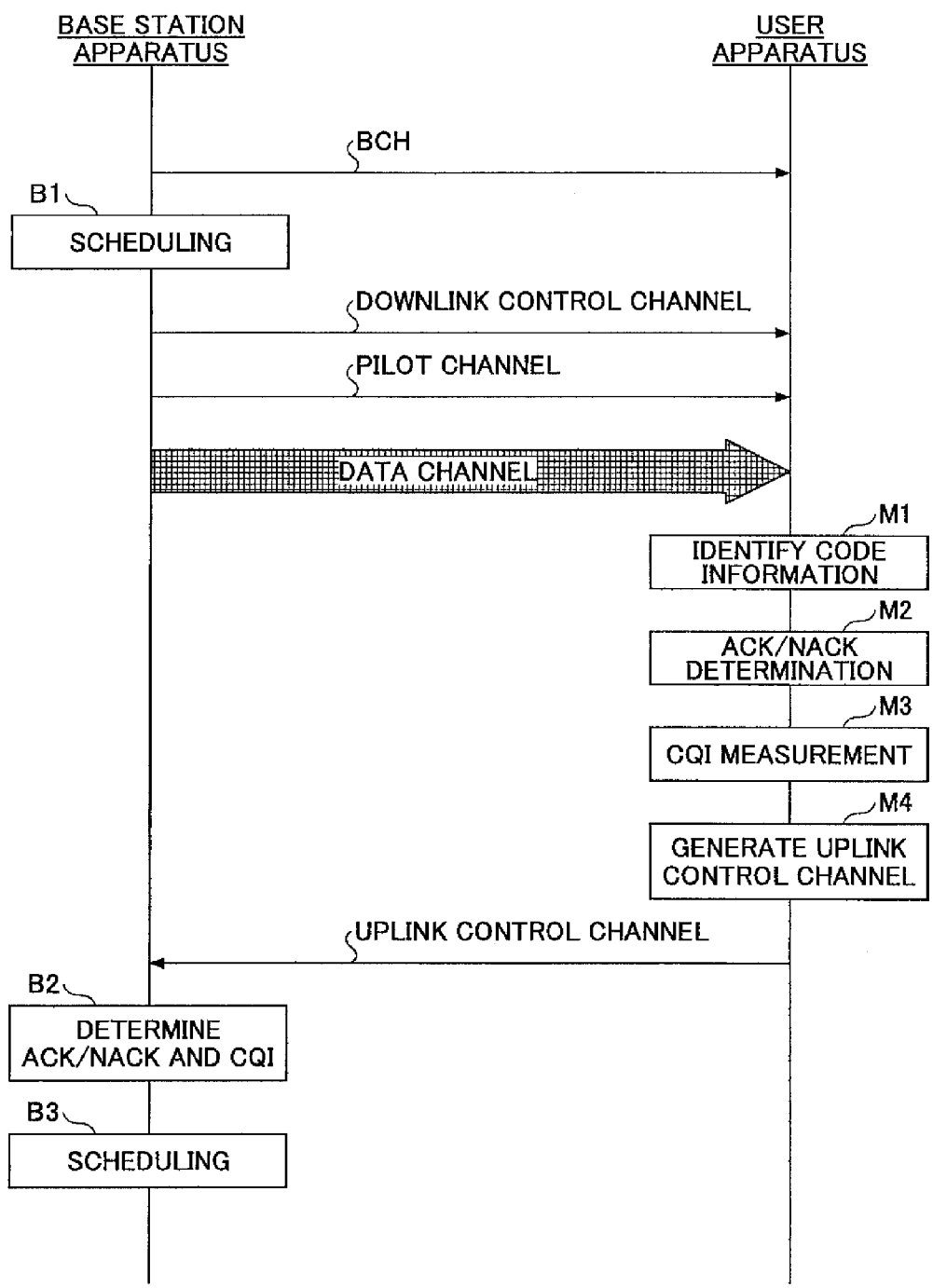
FIG. 8 is a flowchart illustrating an exemplary operation according to one embodiment of the present invention.

FIG. 8 illustrates an operation according to one embodiment of the present invention. In this exemplary operation, general code information relating to all user apparatuses is transmitted in broadcast channels. Each of the user apparatuses uniquely derives code information specific to itself from the broadcast information. The general code information may include an information item indicating that N CAZAC code sequences (C#1, C#2, . . . , C#N) are used in a cell, an information item indicating that M cyclic shift amounts (0, $L_A$, . . . , $(M-1) \times L_A$) are possible for each sequence, an information item indicating that the FDM scheme is used and F bands (Bw1, Bw2, . . . , BwF) are available, and/or other information items, for example.

At step B1, the base station apparatus performs downlink scheduling to transmit a downlink control channel (L1/L2 control channel), a downlink data channel and a pilot channel to a user apparatus.

At step M1, the user apparatus identifies information (code information for that user apparatus) on codes for use in an uplink control channel based on information in the downlink control channel.

Figure 9:
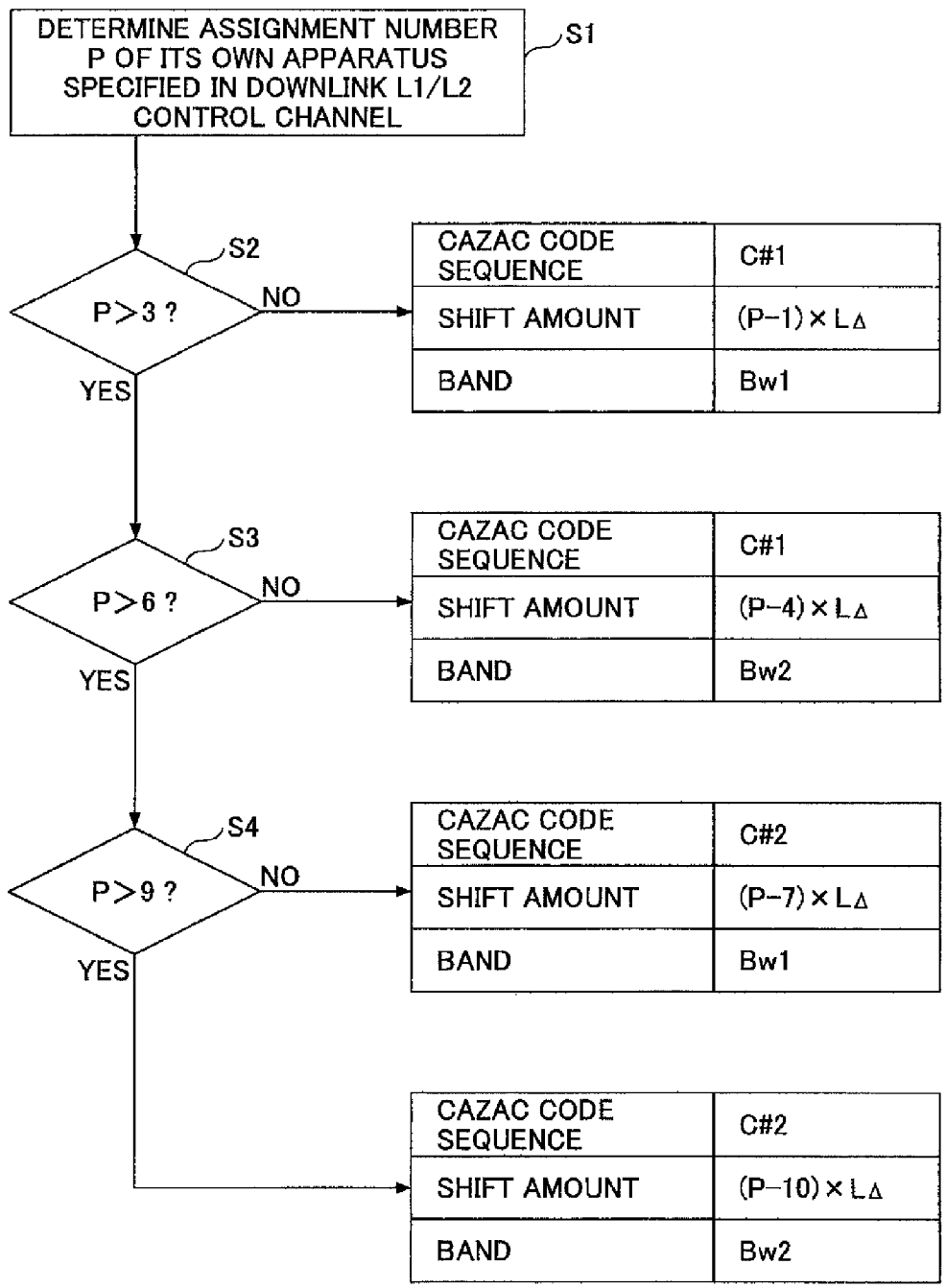
FIG. 9 is a flowchart of exemplary identification of code information from broadcast information and an assignment number.

FIG. 9 illustrates an exemplary identification for identifying the code information available in step M1. For simplicity, two CAZAC code sequences (C#1, C#2) are provided. Also, three cyclic shift amounts (0, $L_A$, $2L_A$) are provided for each of the sequences. Also, two available bands (Bw1, Bw2) are provided. Accordingly, twelve (2×3×2=12) user apparatuses can be differentiated. These values are simply illustrative, and any other appropriate values may be used.

At step S1, a user apparatus checks an assignment number P (=1, 2, . . . , 12) for the user apparatus itself as specified in a downlink L1/L2 control channel.

At step S2, the user apparatus determines whether the assignment number P is greater than 3. If the determination is NO (P=1, 2, 3), the user apparatus determines that the sequence number C#1, the cyclic shift amount $(P-1) \times L_A$ and the band Bw1 are assigned. On the other hand, if the assignment number is greater than 3, the process control proceeds to step S3.

At step S3, the user apparatus determines whether the assignment number P is greater than 6. If the determination is NO (P=4, 5, 6), the user apparatus determines that the sequence number C#1, the cyclic shift amount $(P-4) \times L_A$ and the band Bw2 are assigned. On the other hand, if the assignment number is greater than 6, the process control proceeds to step S4.

At step S4, the user apparatus determines whether the assignment number P is greater than 9. If the determination is NO (P=7, 8, 9), the user apparatus determines that the sequence number C#2, the cyclic shift amount $(P-7) \times L_A$ and the band Bw1 are assigned. On the other hand, if the assignment number is greater than 9 (P=10, 11, 12), the user apparatus determines that the sequence number C#2, the cyclic shift amount $(P-10) \times L_A$ and the band Bw2 are assigned.

Figure 10:
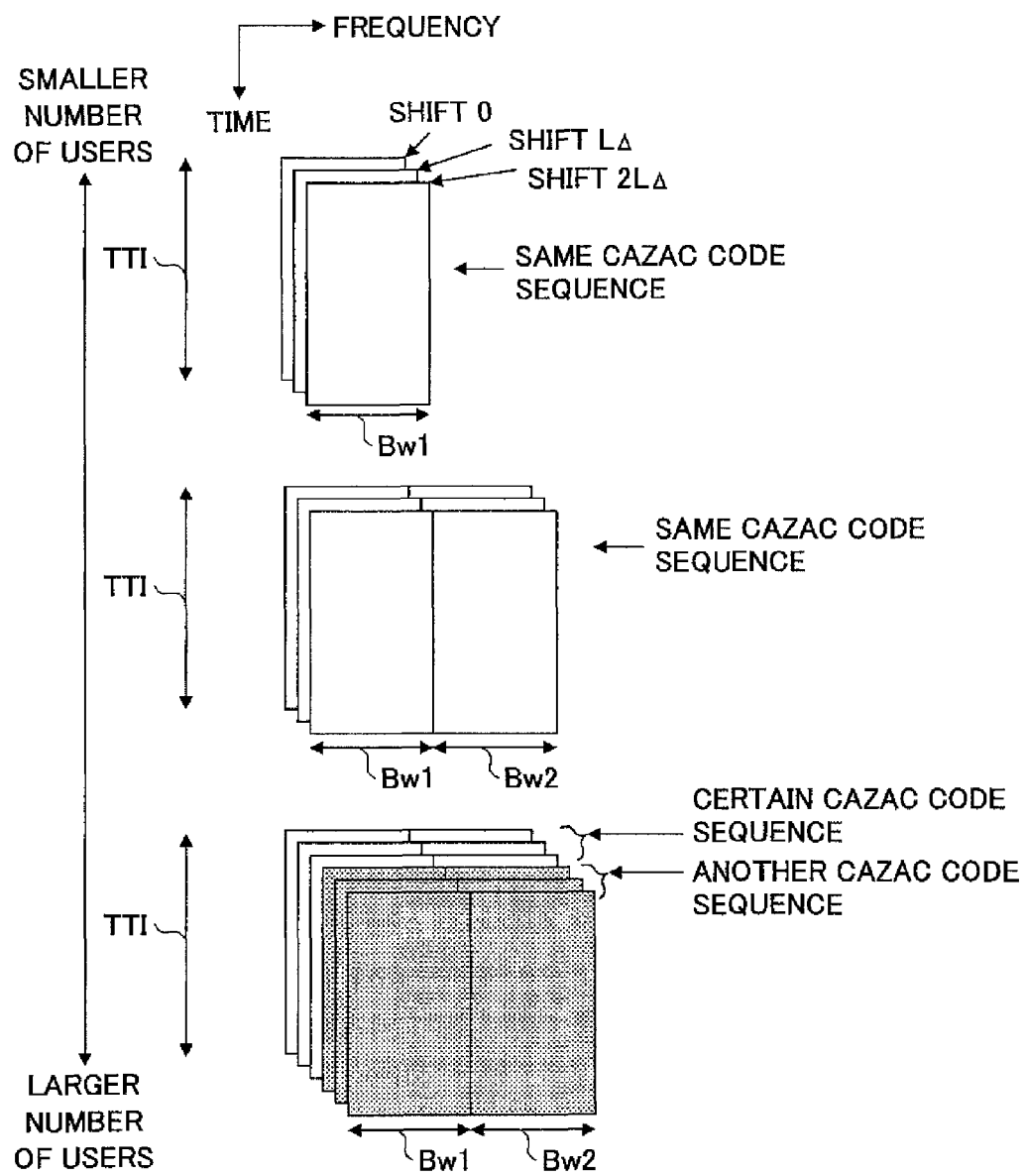
FIG. 10 illustrates exemplary CAZAC codes, cyclic shift amounts and bands resulting from execution of the flowchart in FIG. 9.

FIG. 10 illustrates exemplary CAZAC codes, cyclic shift amounts and bands resulting from execution of the flowchart in FIG. 9. As illustrated, user apparatuses are first multiplexed in accordance with a code division multiplexing (CDM) scheme under the same CAZAC code sequence. If the number of user apparatuses additionally increases, the user apparatuses are code-multiplexed in another band under the same CAZAC code sequence. Then, the CDM scheme is applied to each of the available bands. In other words, although both the CDM and the FDM are applied, the application of the CDM is provided with higher priority. In the case where user apparatuses are multiplexed exceeding the number of user apparatuses that can be differentiated under a certain CAZAC code sequence in accordance with the CDM and the FDM schemes, another CAZAC code sequence is provided, and these user apparatuses are multiplexed in accordance with the CDM and/or the FDM schemes. It is assumed that N CAZAC code sequences (C#1, C#2, . . . , C#N) are used within a cell, M cyclic shift amounts (0, $L_A$, . . . , $(M-1) \times L_A$) are provided for each of the sequences, the FDM scheme is applied, and F bands (Bw1, Bw2, BwF) are available. Under these assumptions, a sequence number of the CAZAC code is represented as an integer resulting from rounding up of (P/(M×F)). The ((P−(n−1)×(m×F))/M)-th band is used. The cyclic shift amount is represented as a product of $L_A$ and (P−((n−1)×(M×F))−(f−1)×M=P mod M).

In the embodiment illustrated in conjunction with FIGS. 9 and 10, when assignment number or user multiplexing order exceeds three, another band Bw2 starts to be used. On the other hand, even if the user multiplexing order is greater than three and less than or equal to six, the same band Bw1 may be used and another CAZAC code sequence C#2 may be instead used. The CAZAC codes C#1 and C#2 have the relationship that they cannot be derived from each other through cyclic shift and are not mutually orthogonal. On the other hand, the CAZAC codes C#1 and C#2 have a relatively cross-correlation value.

In this manner, code information for each user apparatus can be identified from the broadcast information and the assignment information P. The identified code information is transmitted to the CAZAC code generation unit 332, the cyclic shift unit 334, the frequency setting unit 336 and the pilot signal generation unit 338 in FIG. 3.

At step M2 in FIG. 8, the user apparatus determines whether each packet in a downlink data channel includes an error. This error determination may be realized in a CRC (Cyclic Redundancy Check) scheme, for example. Alternatively, the error determination may be realized in any other appropriate error detection schemes as well known in the art. The user apparatus determines which of a positive response (ACK) indicative of no error (or if an error occurs, the error is acceptable) and a negative response (NACK) indicative of the presence of an error is to be replied for each packet. The acknowledgement information is configured from the positive response (ACK) and the negative response (NACK).

At step M3, the user apparatus measures reception quality of a downlink pilot channel and derives the CQI through conversion the measured reception quality into a numerical value within a certain range. For example, if the reception quality is represented in 32 levels, the CQI represented in 5 bits can be derived through conversion of the current reception quality such as SIR into a numerical value indicating which level the reception quality belongs to.

Steps M2 and M3 are not necessarily performed in that order. The determination of the acknowledgement information and the measurement of the CQI may be performed at any suitable time points.

At step M4, an uplink control channel is generated to indicate one or both of the acknowledgement information (ACK/NACK) and the CQI to the base station. As mentioned above, the block-wise modulation pattern generation unit in FIG. 3 provides one factor for each of 12 blocks and thus will provide 12 factors (first to twelfth factors) in total for each TTI. One or more of the twelve factors represent the acknowledgement information or the CQI. The uplink control channel may have the frame arrangement as illustrated in FIGS. 4 and 5. For example, the first long block (LB1) is generated by multiplying the first factor across one (cyclically shifted) CAZAC code sequence assigned to the user apparatus. The second long block (LB2) is generated by multiplying the second factor with the same CAZAC code sequence. Similarly, the K-th long block (LBK) is generated by multiplying the k-th factor with the same CAZAC code sequence. In this manner, a frame for the uplink control channel is configured to have the twelve long blocks.

The uplink control channel generated as mentioned above is transmitted from the user apparatus to the base station in a dedicated band.

At step B2, the base station apparatus receives and demodulates the uplink control channels from multiple user apparatuses. Although the user apparatuses transmit the similar uplink control channels, the user apparatuses may use CAZAC code sequences of different cyclic shift amounts, different bands or different CAZAC code sequences. As mentioned above, only one factor is totally multiplied with the CAZAC code sequence for different long blocks, and thus the base station apparatus can add the uplink control channels received from the user apparatuses in the same phase. As a result, the orthogonality between CAZAC codes with different cyclic shift amounts of the same sequence can be maintained, and thus the base station apparatus can orthogonally separate individual signals from the user apparatuses. Even if non-orthogonal CAZAC codes are used, the user apparatuses can be differentiated at an interference level lower than random sequences. In addition, the base station apparatus can determine contents of the acknowledgement information and/or the CQI by determining the first through twelfth factors used in the uplink control channels for the respective user apparatuses.

At step B3, the base station apparatus performs retransmission control, resource assignment and/or other operations based on the acknowledgement information (ACK/NACK) and/or the CQI transmitted from the user apparatus in the uplink control channel.

Second Embodiment

Figure 11:
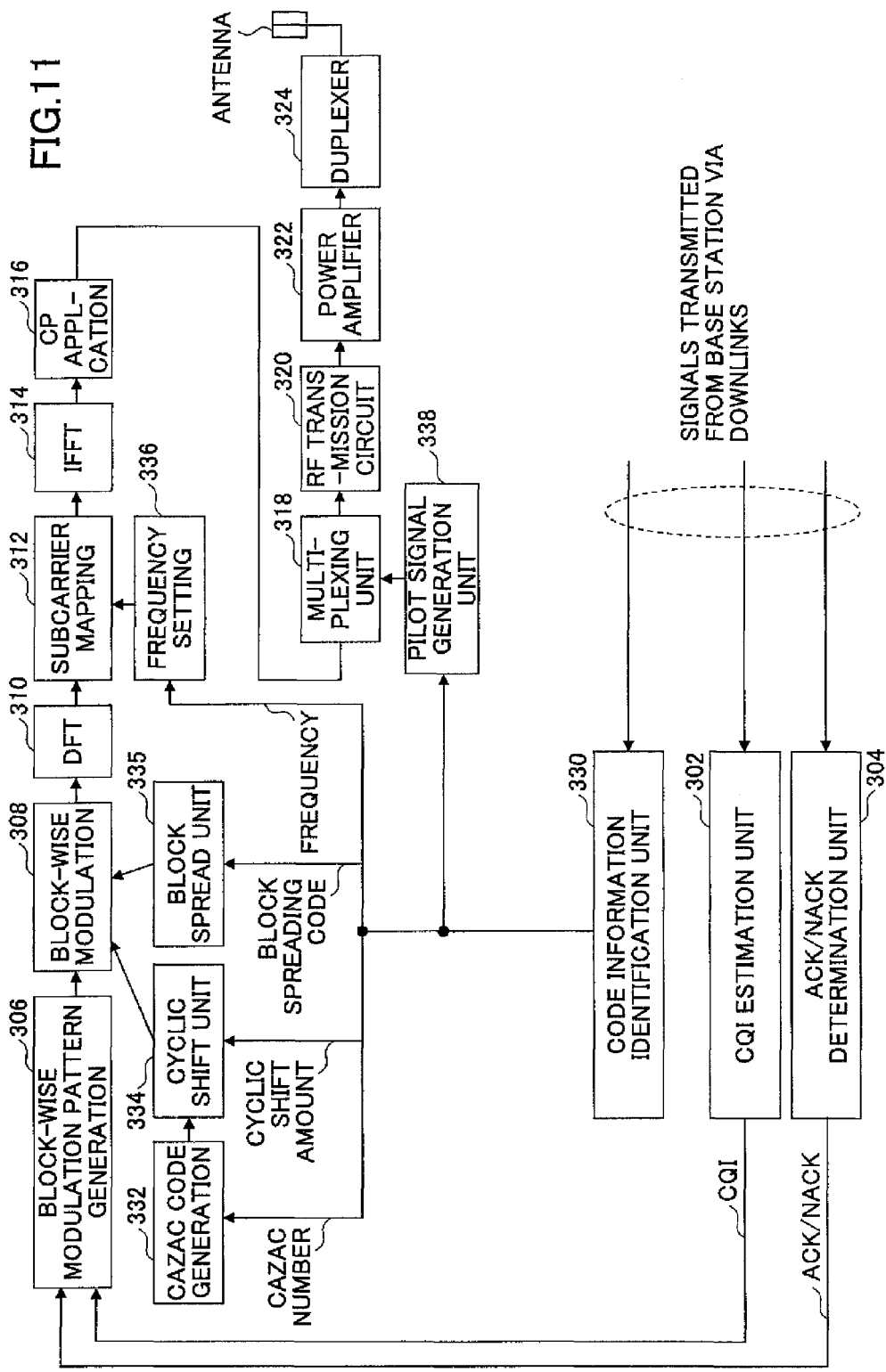
FIG. 11 is a block diagram illustrating a user apparatus using block spreading codes according to one embodiment of the present invention.

FIG. 11 is a block diagram illustrating a user apparatus using block spreading codes according to the second embodiment of the present invention. The illustrated user apparatus is the almost same as the user apparatus in FIG. 3, but they differ in utilization of a block spreading code (BLS). The user apparatus in FIG. 11 includes a block spread unit 335. The block spread unit 335 provides a set of a predefined number of factors (block spreading codes), each of which is multiplied with each long block (LB). The block spreading code is an orthogonal code sequence, and information supplied from the code information identification unit 330 specifies which orthogonal code sequence is used.

Figure 12:
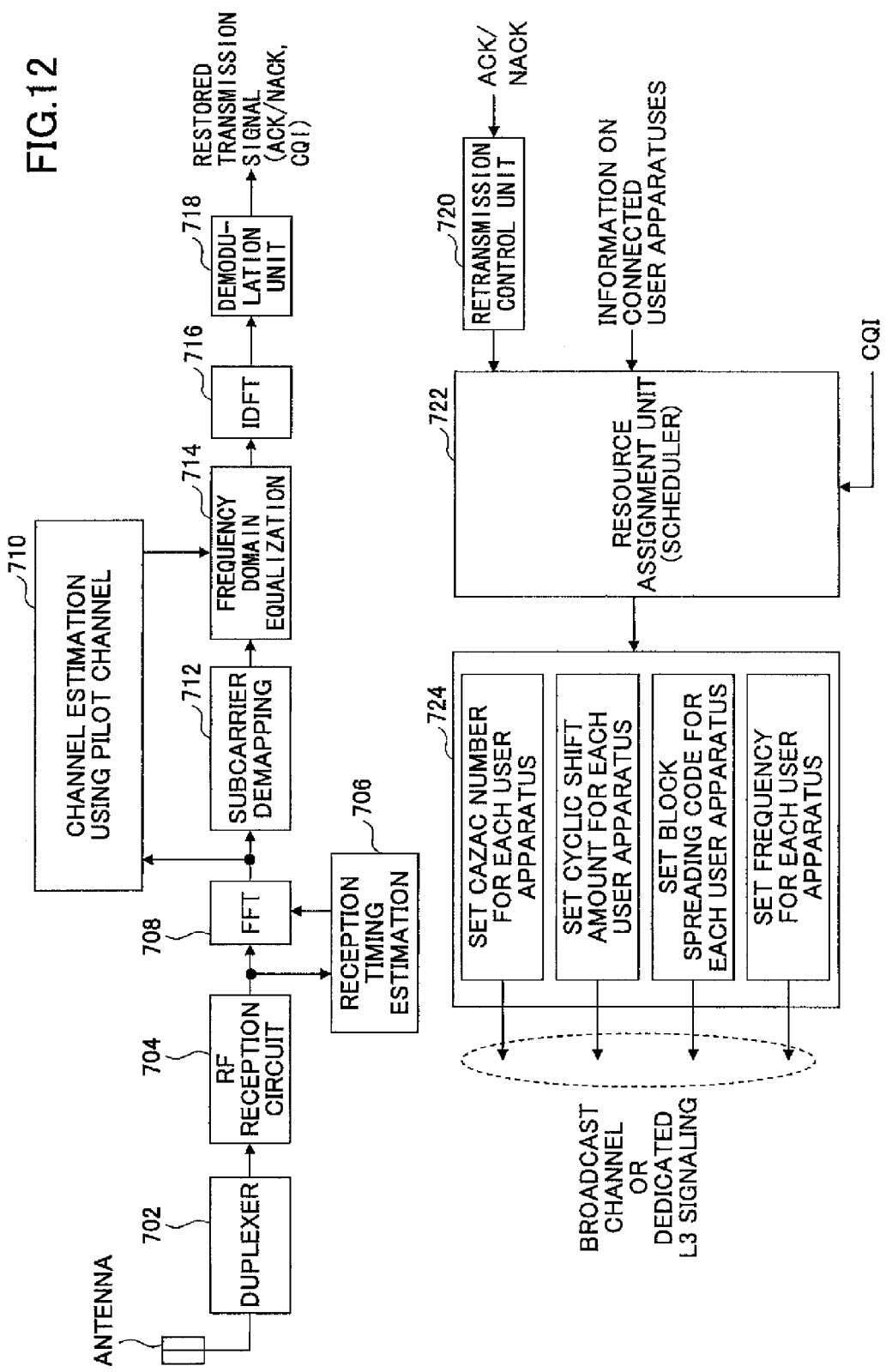
FIG. 12 is a block diagram illustrating a base station apparatus using block spreading codes according to one embodiment of the present invention.

FIG. 12 illustrates a base station apparatus using block spreading codes according to the second embodiment of the present invention. The illustrated base station apparatus is the almost same as the base station apparatus in FIG. 7, but they differ in utilization of a block spreading code (BLS). The base station apparatus in FIG. 12 specifies information (code information) indicating which block spreading code is used as well as a sequence number indicative of a CAZAC code sequence, a cyclic shift amount and an available frequency band.

Figure 13:
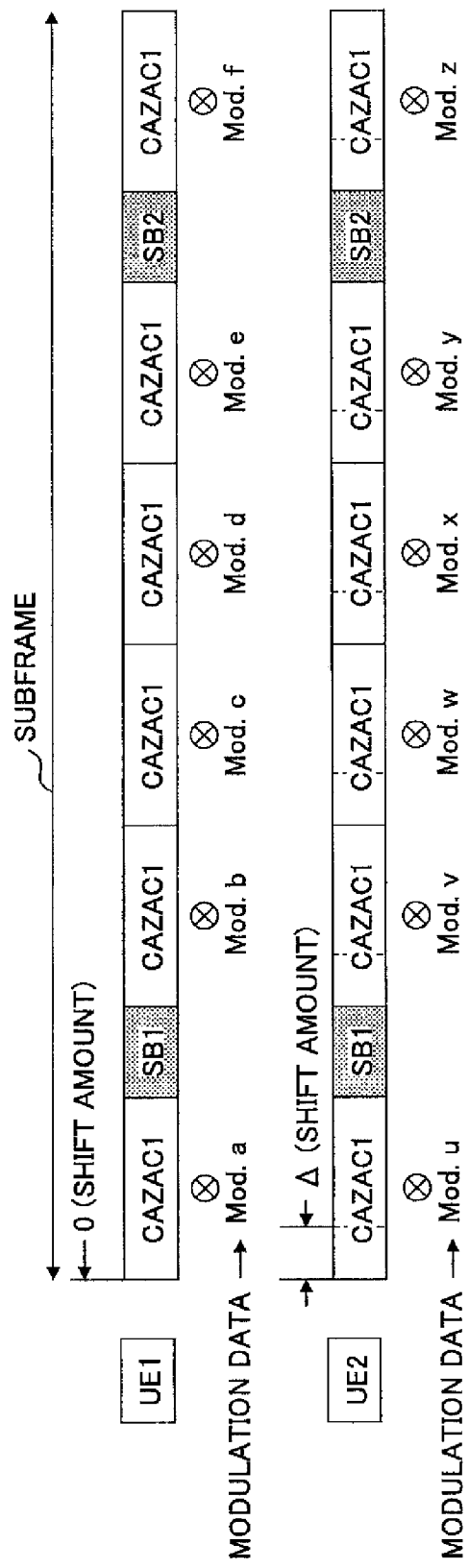
FIG. 13 illustrates an exemplary arrangement of factors multiplied in long blocks.

FIG. 13 illustrates exemplary subframes for a first user apparatus UE1 and a second user apparatus UE2 without multiplication of block spreading codes. Although the first and second user apparatuses use a certain CAZAC code sequence (CAZAC1), the first and the second user apparatuses use different cyclic shift amounts Δ. Accordingly, two subframes transmitted from the user apparatuses are mutually orthogonal. "Mod.a" represents data, that is, a multiplier factor, modulated into the first long block for the first user apparatus UE1. "Mod.a" to "Mod.f" correspond to the first to sixth factors (or the seventh to eighth factors) for the first user apparatus UE1. "Mod.u" to "Mod.z" correspond to the first to sixth factors (or the seventh to eighth factors) for the second user apparatus UE2.

Figure 14:
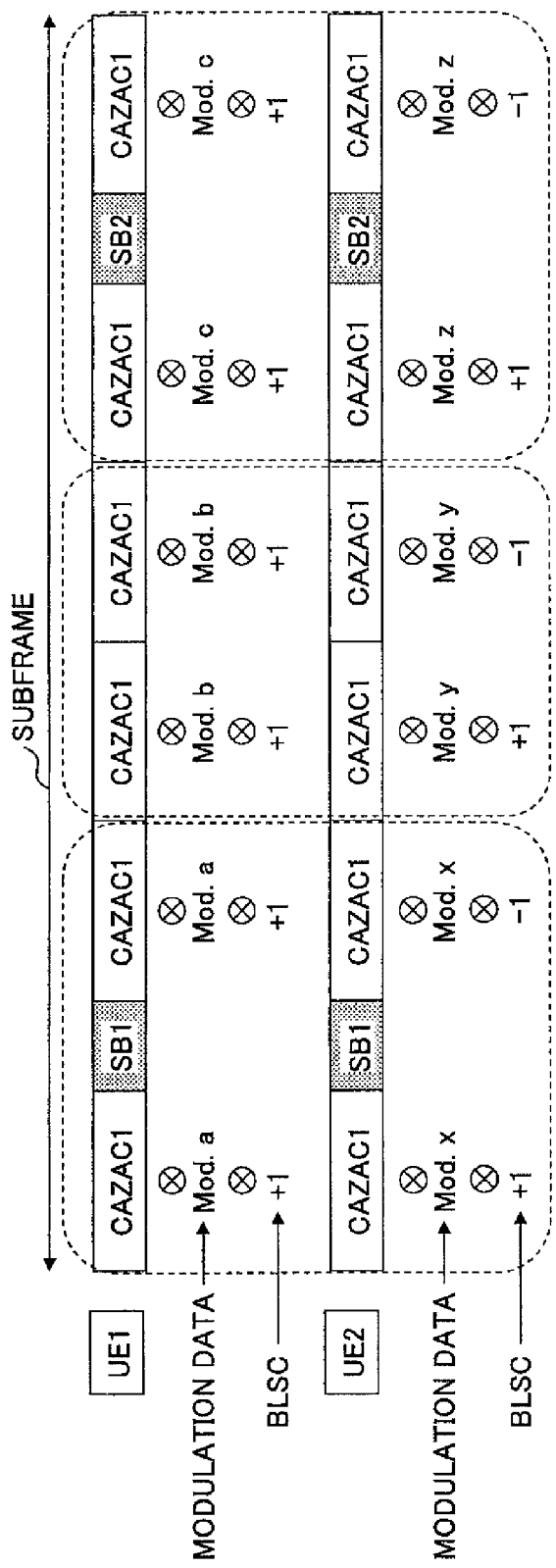
FIG. 14 illustrates an exemplary arrangement of factors and block spreading codes in long blocks.

FIG. 14 illustrates one example where block spreading codes are multiplied with individual long blocks for the first and second user apparatuses UE1, UE2. In the illustrated example, a certain factor is provided for each of the long blocks for the user apparatuses (in addition to modulation data). This factor constitutes a block spreading code (BLSC), and as enclosed in dashed boxes in the illustration, orthogonal codes (1, 1) and (1, −1) are provided for the first and second user apparatuses UE1, UE2, respectively. As mentioned in conjunction with the first embodiment, as long as the same factor (value) are multiplied with one or more long blocks, a CAZAC code for arranging the long blocks maintains orthogonality. Thus, if a set of factors multiplied with each of the several blocks are arranged to be orthogonal between the user apparatuses, individual codes for the user apparatuses can be made orthogonal while maintaining the orthogonality of the CAZAC codes. Note that multiple blocks multiplied with one orthogonal code must have the same contents. In the illustrated example, the first and second factors for the first user apparatus UE1 are commonly "Mod.a", the third and fourth factors are commonly "Mod.b", and the fifth and sixth factors are commonly "Mod.c". Similarly, the first and second factors for the second user apparatus UE2 are commonly "Mod.x", the third and fourth factors are commonly "Mod.y", and the fifth and sixth factors are commonly "Mod.z". For this reason, a limited amount of information can be carried in the first and twelfth factors, but since a relatively smaller number of bits are required to represent ACK/NACK and/or others as mentioned in conjunction with FIG. 5, this restriction is not crucial.

Since the block spreading codes (1, 1) and (1, −1) can be used to differentiate the first and second user apparatuses UE1 and UE2, the same shift amount for the CAZAC codes may be used for the first and second user apparatuses. In other words, it is unnecessary to use different cyclic shift amounts A. For convenience, factors multiplied with long blocks have been described, but some factors may be multiplied with short blocks (SBs).

Figure 15:
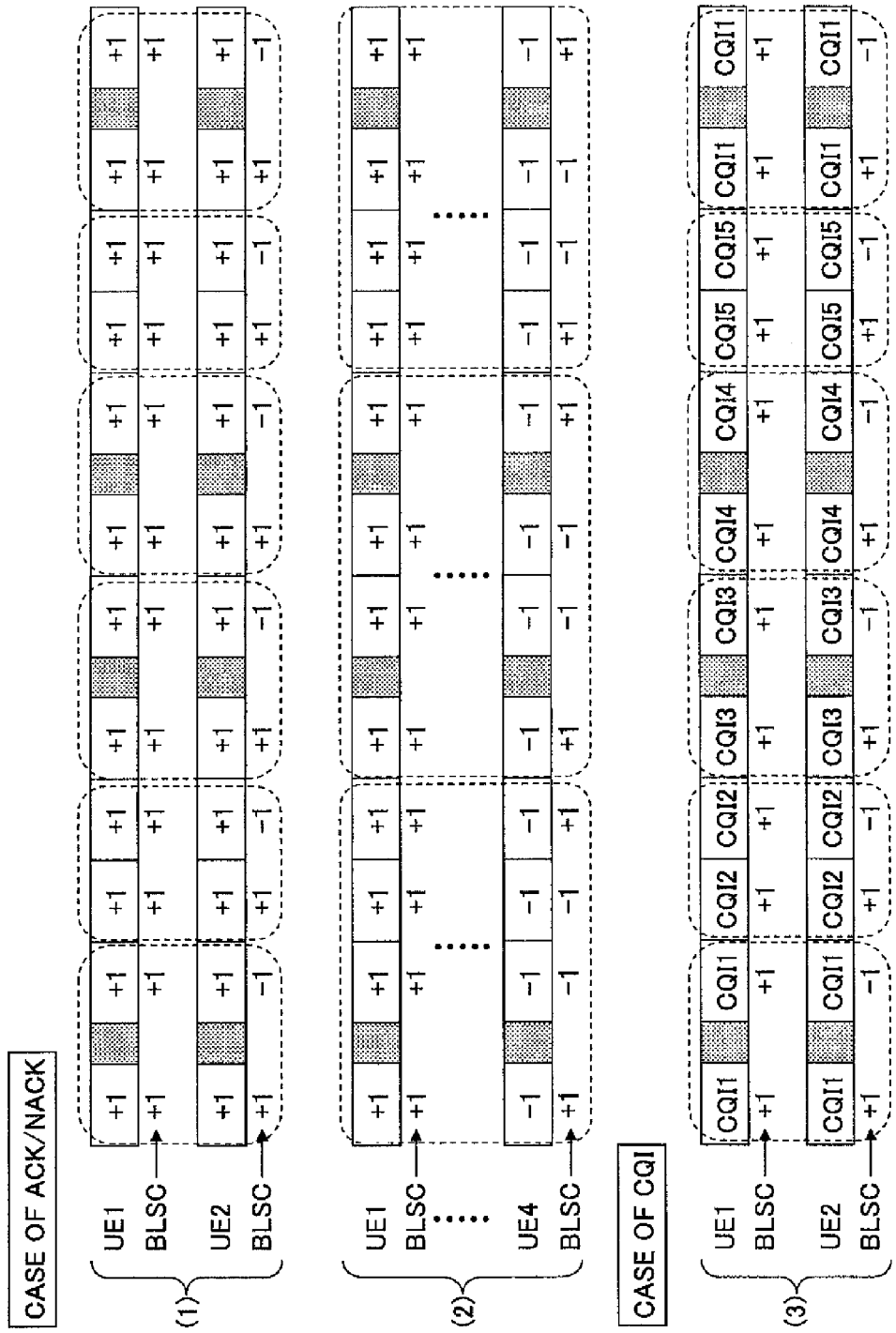
FIG. 15 illustrates exemplary arrangements of first through twelfth factors and block spreading codes multiplexed in long blocks.

FIG. 15 illustrates exemplary arrangement of the first through twelfth factors and block spreading codes. In FIG. 15 (1), a similar example as FIG. 14 is illustrated, and it is assumed that an ACK as illustrated in FIG. 5 is represented by the first through twelfth factors. Further, in FIG. 15 (1), an orthogonal code sequence is multiplied for each pair of blocks, and the first and second user apparatuses can be differentiated.

In FIG. 15 (2), an exemplary case of the orthogonal spreading code length being equal to four is illustrated. In this case, four factors are multiplexed with four long blocks, and four user apparatuses are code-multiplexed. In the illustrated example, four orthogonal codes (+1, +1, +1, +1), (+1, −1, +1, −1), (+1, +1, −1, −1) and (+1, −1, −1, +1) are used. As mentioned above, in subframes transmitted from user apparatuses, the same data (for example, "Mod.a" for the first user apparatus) has to be modulated in four blocks. In this manner, the code length is not limited to two or four, and orthogonal codes of any other appropriate lengths may be used. The code length may be determined on the base station apparatus depending on the number of user apparatuses, bands and/or others, for example.

In FIG. 15 (3), an exemplary case of transmission of the CQI is illustrated. Similar to the case in FIG. 5 (B), individual bits for representing the CQI are illustrated as CQI1 through CQI5.

In this case, any appropriate orthogonal codes may be used. As illustrated, components of the orthogonal code may be "+1" and "−1" or may be represented as a phase factor such as (1, 1, 1), (1, exp(j2π/3), exp (j4π/3)), and (1, exp (j4π/3), exp (j2π/3)).

According to this embodiment, a larger number of orthogonal multiplexing orders can be achieved than those of the first embodiment by using not only cyclic shift amounts of CAZAC codes but also block spreading codes. In the case where the CDM and FDM schemes are used together, the CDM scheme increases the number of available multiplexing orders, which may further reduce bandwidth modifications caused by application of the FDM scheme. Thus, it is possible to make reporting of the bandwidth modifications less frequent and reduce involved consumption of radio resources.

Third Embodiment

Figure 16:
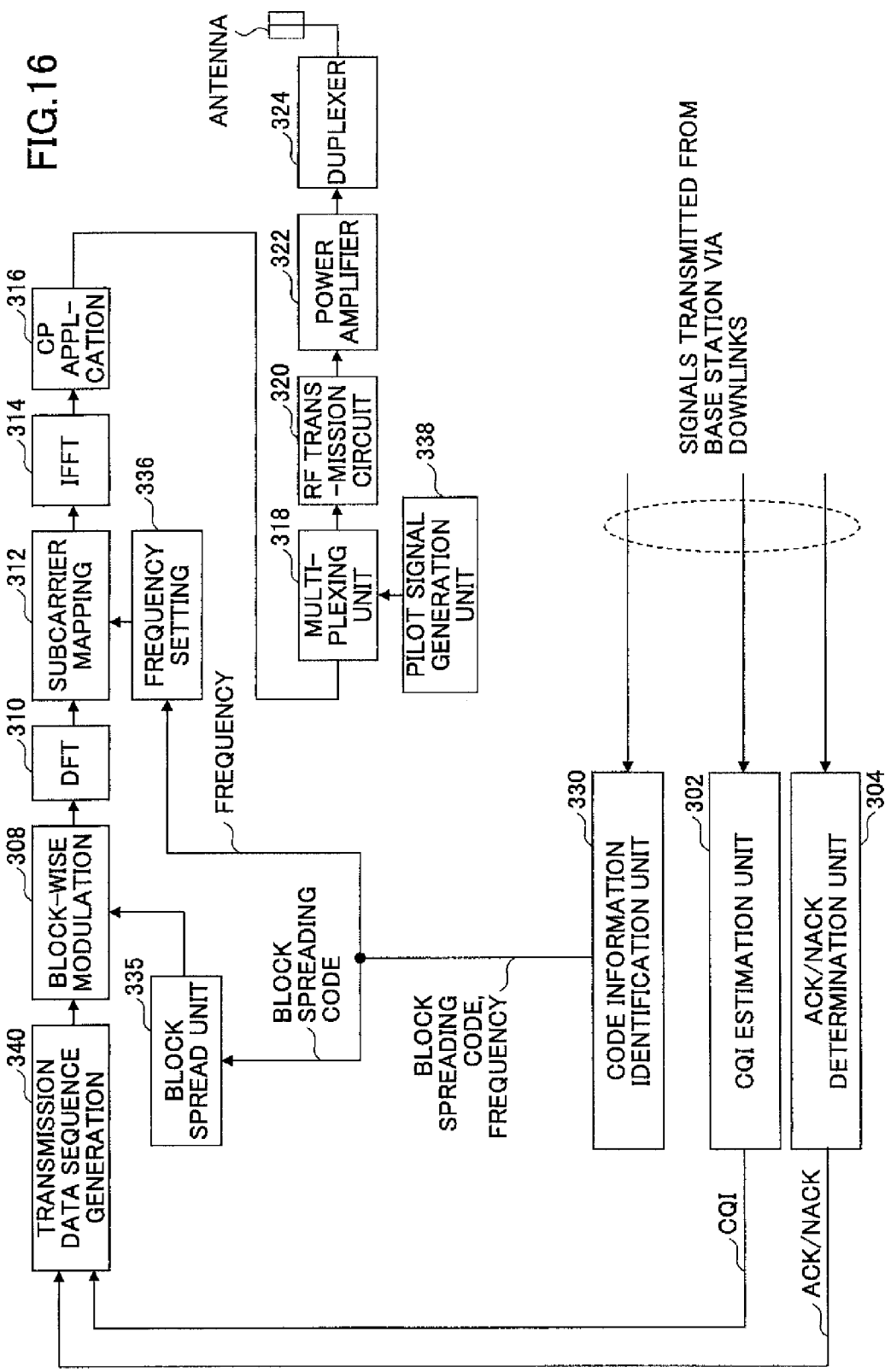
FIG. 16 is a block diagram illustrating a user apparatus using block spreading codes according to one embodiment of the present invention.

FIG. 16 illustrates a user apparatus using block spreading codes according to the third embodiment of the present invention. The illustrated user apparatus differs from the user apparatus in FIG. 11 in that the user apparatus in FIG. 16 can transmit several bits to several tens of bits of information in one long block. The user apparatus in FIG. 16 includes a transmission data sequence generation unit 340 instead of the block-wise modulation pattern generation unit. Also, the illustrated user apparatus does not use CAZAC sequences, and thus the CAZAC code generation unit 332 and the cyclic shift unit 334 are omitted.

The transmission data sequence generation unit 338 generates a data sequence indicative of the acknowledgement information (ACK/NACK) or the CQI.

The block-wise modulation unit 308 associates a transmission data sequence supplied from the transmission data sequence generation unit 340 with one long block and multiplies each long block with an orthogonal code sequence. Then, the block-wise modulation unit 308 multiplies each of the long blocks multiplied with the orthogonal code sequence with a set of a predefined number of factors (block spreading codes) provided by a block spread unit 335 as described below.

The block spread unit 335 provides the set of factors (block spreading codes) and multiplies each of the factors with each long block (LB). The block spreading codes are orthogonal code sequences, and information supplied from the code information identification unit 330 specifies which orthogonal code sequence is used.

Figure 17:
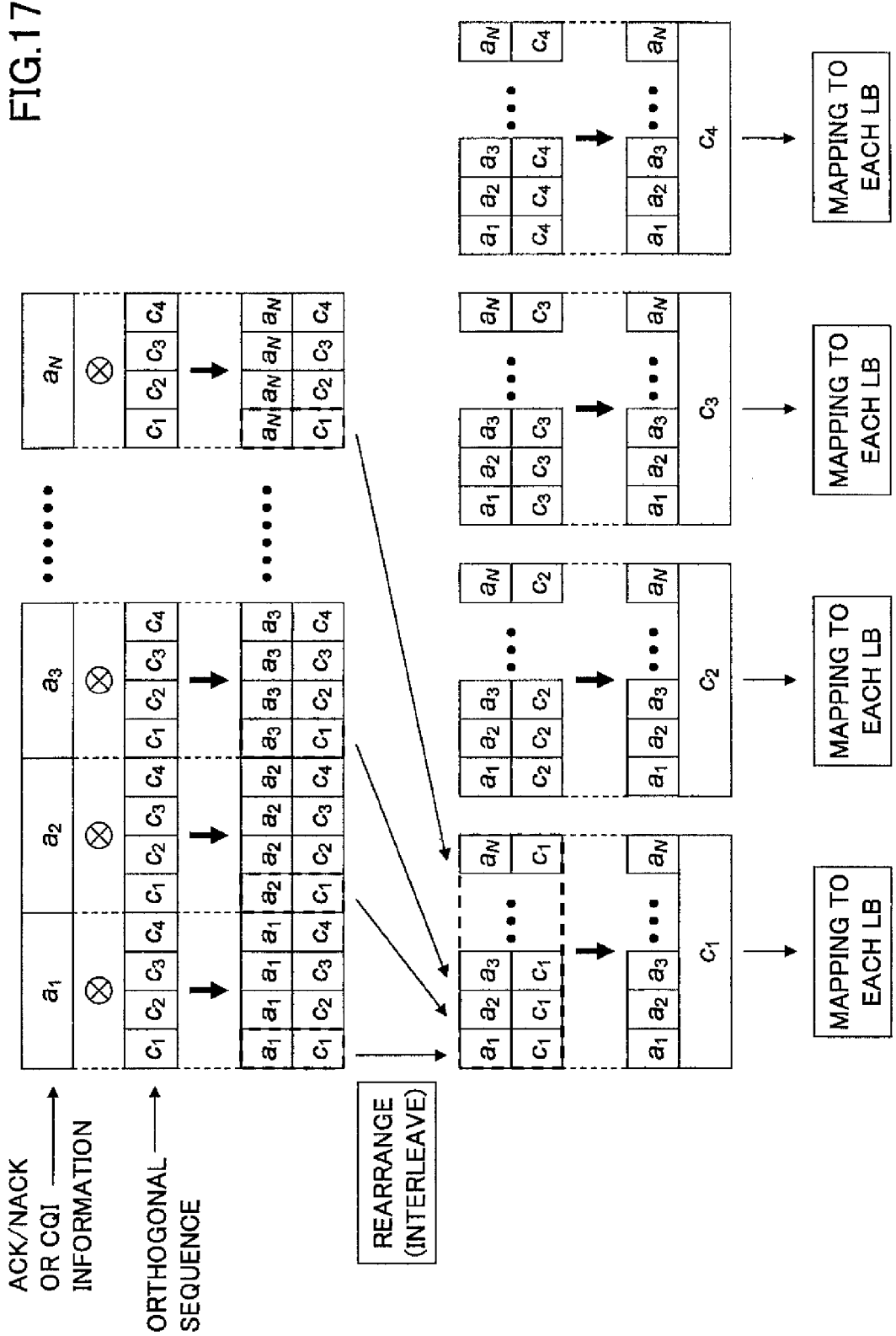
FIG. 17 illustrates transmission data sequences resulting from multiplication of orthogonal code sequences mapped to long blocks.

FIG. 17 illustrates exemplary generation of transmission data sequences multiplied with orthogonal code sequences mapped to long blocks.

Several bits to several tens of bits of data sequence indicative of the acknowledgement information (ACK/NACK) or the CQI, for example, "$a_1, a_2, \ldots, a_N$" (N is a positive integer), are generated. Also, an orthogonal sequence "$C_1, C_2, C_3, C_4, \ldots a_m$" (M is a positive integer) is provided. For example, if the spreading rate is equal to M, "$C_1, C_2, C_3, \ldots, C_M$" is provided. An exemplary case of the spreading rate of four is described below, the present embodiment can be similarly applied to other cases of the spreading rate other than four.

An orthogonal sequence is multiplied with a data sequence. In other words, multiplications "$a_1 \times C_1$", "$a_1 \times C_2$", "$a_1 \times C_3$", "$a_1 \times C_4$", "$a_2 \times C_1$", ..., "$a_4 \times C_4$" are carried out. Then, reordering is carried out for each multiplied orthogonal sequence.

As a result, a number of blocks corresponding to the spreading rate (spreading code sequence) are generated where the orthogonal sequence is multiplied with the data sequence. These blocks are mapped to long blocks and then are multiplied with the block spreading code.

In the user apparatuses according to the first and second embodiments, only one bit of information can be transmitted in each long block. In this embodiment, however, several bits of information, for example, N bits of information, can be transmitted.

For example, in the case where the spreading rate is equal to four and transmission information has four bits, four bits can be transmitted in four long blocks, which may be substantially the same as transmission of one bit of information in one long block. However, in the case where the spreading rate is equal to four and transmission information has 12 bits, 12 bits can be transmitted in four long blocks, which means that three bits of information can be substantially transmitted in one long block.

Figure 18:
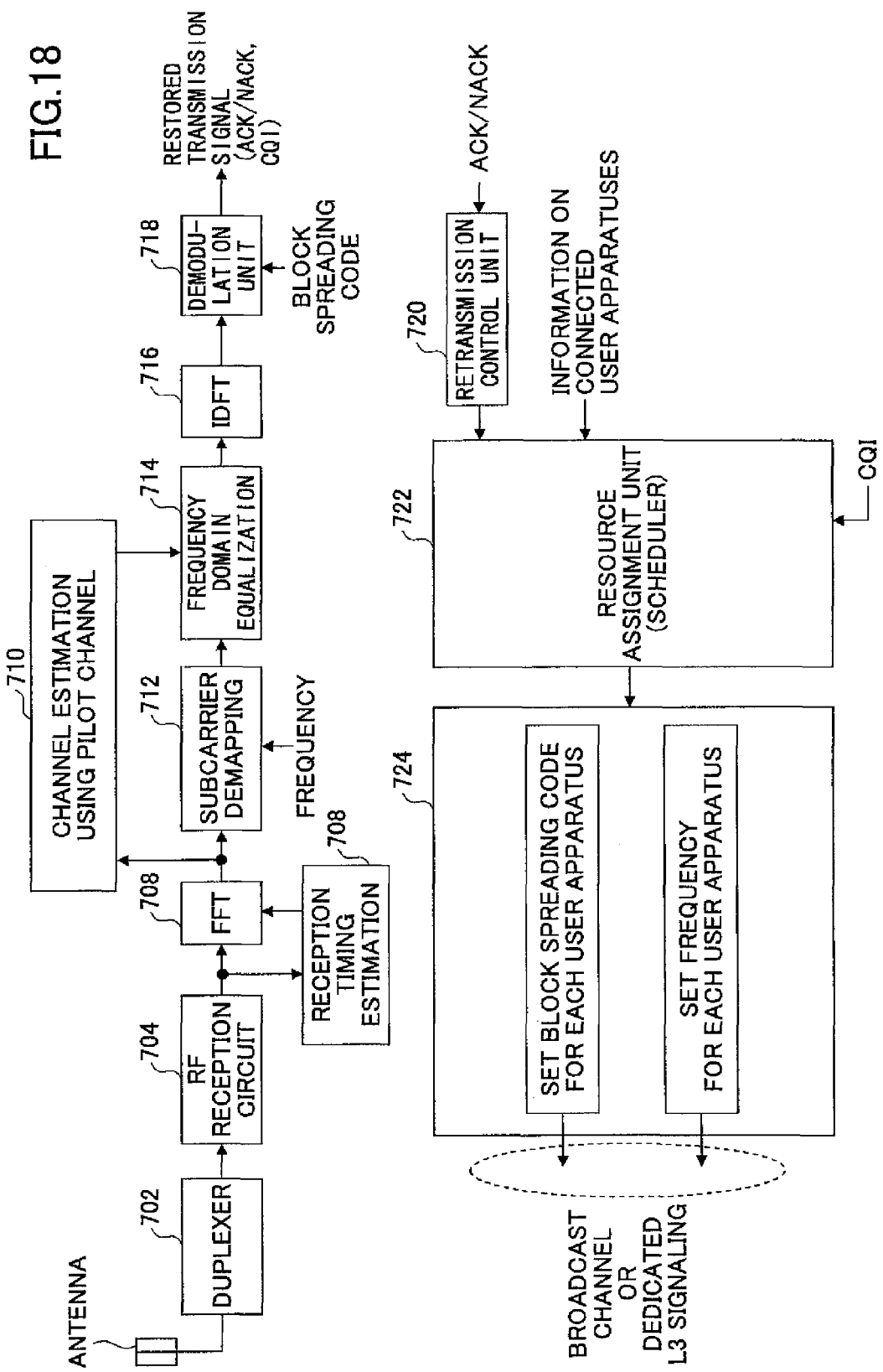
FIG. 18 is a block diagram illustrating a base station apparatus using block spreading codes according to one embodiment of the present invention.

FIG. 18 illustrates a base station apparatus using block spreading codes according to the third embodiment of the present invention. The illustrated base station apparatus is the almost same as the base station apparatus in FIG. 12, but they differ in that the base station apparatus in FIG. 18 does not have to set a sequence number indicative of a CAZAC code sequence and a cyclic shift amount. In the base station apparatus in FIG. 18, a code information setting unit 724 specifies information (code information) indicating which frequency band is available and what block spreading code is used.

Also in this embodiment, the block spreading code can be used to differentiate user apparatuses. For example, if the orthogonal spreading code length is equal to four, four factors are multiplied with each four long blocks. For example, if four user apparatuses are code-multiplexed, four orthogonal codes (+1, +1, +1, +1), (+1, −1, +1, −1), (+1, +1, −1, −1) and (+1, −1, −1, +1) are used. The code length is not limited to four, and orthogonal codes of any other appropriate lengths may be used. The code length may be determined in the base station apparatus depending on the number of user apparatuses, bands and/or others, for example.

Note that any appropriate orthogonal codes may be used. As illustrated, code components may be "+1" and "−1" or may be represented as a phase factor such as (1, 1, 1), (1, exp (j2π/3), exp (j4π/3)), and (1, exp (j4π/3), exp (j2π/3)).

According to this embodiment, the block spreading codes are used for orthogonal CDM transmission, and thus a larger number of bits can be transmitted than the first and second embodiments using cyclic shift amounts for CAZAC sequences.

Also, user apparatuses can be differentiated through orthogonal codes (block spreading codes) multiplied among long blocks.

Also, orthogonal CDM is enabled through block spreading for other sequences where the block spreading is applied, for example, other sequences generated through cyclic shift of CAZAC sequences as mentioned in conjunction with the second embodiment.

For convenience, the present invention has been described with reference to the distinct embodiments, but separation of the embodiments is not essential to the present invention and two or more of the embodiments may be used together as needed. Some specific numerals have been used to facilitate understanding of the present invention, but unless otherwise noted, these numerals are simply illustrative and any other appropriate values may be used.

The present invention has been described with reference to the specific embodiments of the present invention, but the embodiments are simply illustrative and variations, modifications, alterations and substitutions could be contrived by those skilled in the art. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be made by those skilled in the art without deviating from the spirit of the present invention.

This international patent application is based on Japanese Priority Applications No. 2006-272352 filed on Oct. 3, 2006, No. 2006-298313 filed on Nov. 1, 2006 and No. 2007-001855 filed on Jan. 9, 2007, the entire contents of which are hereby incorporated by reference.

The invention claimed is:

1. A base station apparatus for receiving at least an uplink control channel from multiple user apparatuses in accordance with a single-carrier scheme, comprising: a processor comprising:
   an extraction unit configured to extract at least one of acknowledgement information and channel condition information from an uplink control channel, the acknowledgement information indicating a positive response or a negative response to a downlink data channel, the channel condition information indicating a downlink channel condition;
   a scheduler configured to assign resources to the downlink data channel based on the channel condition information and the acknowledgement information; and
   a transmission unit configured to transmit the downlink data channel,
   wherein the uplink control channel includes one or more unit blocks including a sequence resulting from multiplication of a uniform factor with all chips of an orthogonal code sequence for a cyclic shift amount individually indicated from the base station apparatus to the user apparatus, different cyclic shift mounts being assigned to different user apparatuses, and
   wherein contents of the acknowledgement information and/or individual bits for representing the channel condition information are represented in a set of factors multiplied in each of the one or more unit blocks.

2. The base station apparatus as claimed in claim 1, wherein the orthogonal code sequence comprises a CAZAC code sequence.

3. The base station apparatus as claimed in claim 1, wherein the factor comprises "+1" or "−1."

4. The base station apparatus as claimed in claim 1, wherein the acknowledgement information is represented in a factor multiplied in each of some unit blocks of the unit blocks, and the channel condition information is represented in a factor multiplied in each of other unit blocks of the unit blocks.

5. The base station apparatus as claimed in claim 1, wherein the number of unit blocks corresponding to upper bits is greater than or equal to the number of unit blocks corresponding to lower bits.

6. The base station apparatus as claimed in claim 1, wherein predefined correspondence between resource assignment information to the uplink control channel and the orthogonal code sequence is set such that the orthogonal code sequence is derived based on the resource assignment information.

7. A base station apparatus for receiving at least an uplink control channel from multiple user apparatuses in accordance with a single-carrier scheme, comprising: a processor comprising:
   an extraction unit configured to extract at least one of acknowledgement information and channel condition information from an uplink control channel, the acknowledgement information indicating a positive response or a negative response to a downlink data channel, the channel condition information indicating a downlink channel condition;
   a scheduler configured to assign resources to the downlink data channel based on the channel condition information and the acknowledgement information; and
   a transmission unit configured to transmit the downlink data channel,
   wherein if no resource is assigned to transmit an uplink data channel, the uplink control channel is received in a predefined dedicated band, and
   wherein the uplink control channel includes one or more unit blocks including a sequence resulting from multiplication of a uniform factor with all chips of an orthogonal code sequence for a cyclic shift amount derived based on an assignment number indicated in a downlink control channel, different cyclic shift amounts being assigned to different user apparatuses, and wherein the uplink control channel is received in a dedicated frequency band derived based on the assignment number indicated in the downlink control channel.

8. The base station apparatus as claimed in claim 7, wherein predefined correspondence between resource assignment information to the uplink control channel and the orthogonal code sequence is set such that the orthogonal code sequence is derived based on the resource assignment information, and the correspondence is set to define the number of multiplexed users assignable to each of a first band and a second band in the dedicated band in accordance with a code division multiplexing scheme.

9. The base station apparatus as claimed in claim 7, wherein the orthogonal code sequence comprises a CAZAC code sequence.

10. The base station apparatus as claimed in claim 7, wherein the factor comprises "+1" or "−1."

11. The base station apparatus as claimed in claim 7, wherein contents of the acknowledgement information are represented in a set of factors multiplied in each of the one or more unit blocks.

12. The base station apparatus as claimed in claim 11, wherein the acknowledgement information is represented in a factor multiplied in each of some unit blocks of the unit blocks, and the channel condition information is represented in a factor multiplied in each of other unit blocks of the unit blocks.

13. The base station apparatus as claimed in claim 7, wherein individual bits for representing the channel condition information are represented in a set of factors multiplied in each of multiple unit blocks.

14. The base station apparatus as claimed in claim 13, wherein the number of unit blocks corresponding to upper bits is greater than or equal to the number of unit blocks corresponding to lower bits.

15. A reception method for use in a base station apparatus for receiving at least an uplink control channel from multiple user apparatuses in accordance with a single-carrier scheme, comprising:
extracting at least one of acknowledgement information and channel condition information from an uplink control channel, the acknowledgement information indicating a positive response or a negative response to a downlink data channel, the channel condition information indicating a downlink channel condition;
assigning resources to the downlink data channel based on the channel condition information and the acknowledgement information; and
transmitting the downlink data channel,
wherein the uplink control channel includes one or more unit blocks including a sequence resulting from multiplication of a uniform factor with all chips of an orthogonal code sequence for a cyclic shift amount individually indicated from the base station apparatus to the user apparatus, different cyclic shift amounts being assigned to different user apparatuses, and
wherein contents of the acknowledgement information and/or individual bits for representing the channel condition information are represented in a set of factors multiplied in each of the one or more unit blocks.

16. The reception method as claimed in claim 15, wherein the orthogonal code sequence comprises a CAZAC code sequence.

17. The reception method as claimed in claim 15, wherein the factor comprises "+1" or "−1."

18. The reception method as claimed in claim 15, wherein the acknowledgement information is represented in a factor multiplied in each of some unit blocks of the unit blocks, and the channel condition information is represented in a factor multiplied in each of other unit blocks of the unit blocks.

19. The reception method as claimed in claim 15, wherein the number of unit blocks corresponding to upper bits is greater than or equal to the number of unit blocks corresponding to lower bits.

20. The reception method as claimed in claim 15, wherein predefined correspondence between resource assignment information to the uplink control channel and the orthogonal code sequence is set such that the orthogonal code sequence is derived based on the resource assignment information.

21. A reception method for use in a base station apparatus for receiving at least an uplink control channel from multiple user apparatuses in accordance with a single-carrier scheme, comprising:
extracting at least one of acknowledgement information and channel condition information from an uplink control channel, the acknowledgement information indicating a positive response or a negative response to a downlink data channel, the channel condition information indicating a downlink channel condition;
assigning resources to the downlink data channel based on the channel condition information and the acknowledgement information; and
transmitting the downlink data channel,
wherein if no resource is assigned to transmit an uplink data channel, the uplink control channel is received in a predefined dedicated band, and
wherein the uplink control channel includes one or more unit blocks including a sequence resulting from multiplication of a uniform factor with all chips of an orthogonal code sequence for a cyclic shift amount derived based on an assignment number indicated in a downlink control channel, different cyclic shift amounts being assigned to different user apparatuses, and
wherein the uplink control channel is received in a dedicated frequency band derived based on the assignment number indicated in the downlink control channel.

22. The reception method as claimed in claim 21, wherein the orthogonal code sequence comprises a CAZAC code sequence.

23. The reception method as claimed in claim 21, wherein the factor comprises "+1" or "−1."

24. The reception method as claimed in claim 21, wherein contents of the acknowledgement information are represented in a set of factors multiplied in each of the one or more unit blocks.

25. The reception method as claimed in claim 24, wherein the acknowledgement information is represented in a factor multiplied in each of some unit blocks of the unit blocks, and the channel condition information is represented in a factor multiplied in each of other unit blocks of the unit blocks.

26. The reception method as claimed in claim 21, wherein individual bits for representing the channel condition information are represented in a set of factors multiplied in each of multiple unit blocks.

27. The reception method as claimed in claim 26, wherein the number of unit blocks corresponding to upper bits is greater than or equal to the number of unit blocks corresponding to lower bits.

28. The base station apparatus as claimed in claim 21, wherein predefined correspondence between resource assignment information to the uplink control channel and the orthogonal code sequence is set such that the orthogonal code sequence is derived based on the resource assignment information, and the correspondence is set to define the number of multiplexed users assignable to each of a first band and a second band in the dedicated band in accordance with a code division multiplexing scheme.

29. A user apparatus for transmitting at least an uplink control channel to a base station apparatus in accordance with a single-carrier scheme, comprising:
 a determination unit configured to generate acknowledgement information indicating a positive response or a negative response to a downlink data channel;
 a control channel generation unit configured to generate an uplink control channel including the acknowledgement information; and
 a transmission unit configured to transmit the uplink control channel in a predefined dedicated band if no resource is assigned to transmit an uplink data channel,
 wherein the uplink control channel includes a sequence resulting from multiplication of a uniform factor with all chips of an orthogonal code sequence for the user apparatus for all unit blocks forming a subframe, and
 wherein predefined correspondence between resource assignment information to the uplink control channel and the orthogonal code sequence to be used in the uplink control channel is set such that the orthogonal code sequence to be used in the uplink control channel for the user apparatus is derived based on the resource assignment information to the uplink control channel.

30. The user apparatus as claimed in claim 29, wherein the orthogonal code sequence to be used in the uplink control channel comprises an orthogonal code sequence for a cyclic shift amount individually indicated from the base station apparatus to the user apparatus, different cyclic shift amounts being assigned to different user apparatuses.

31. The user apparatus as claimed in claim 29, wherein the uplink control channel includes one or more unit blocks including a sequence resulting from multiplication of a uniform factor with all chips of an orthogonal code sequence for a cyclic shift amount derived based on an assignment number indicated in a downlink control channel, different cyclic shift amounts being assigned to different user apparatuses, and the uplink control channel is transmitted in a dedicated frequency band derived based on the assignment number indicated in the downlink control channel.

32. The user apparatus as claimed in claim 29, wherein the correspondence is set to define the number of multiplexed users assignable to each of a first band and a second band in the dedicated band in accordance with a code division multiplexing scheme.

33. A transmission method for use in a user apparatus for transmitting at least an uplink control channel to a base station apparatus in accordance with a single-carrier scheme, comprising:
 generating an uplink control channel including acknowledgement information indicating a positive or negative response to a downlink data channel; and
 transmitting the uplink control channel in a predefined dedicated band if no resource is assigned to transmit an uplink data channel,
 wherein the uplink control channel includes a sequence resulting from multiplication of a uniform factor with all chips of an orthogonal code sequence for the user apparatus for all unit blocks forming a subframe, and
 wherein predefined correspondence between resource assignment information to the uplink control channel and the orthogonal code sequence to be used in the uplink control channel is set such that the orthogonal code sequence to be used in the uplink control channel for the user apparatus is derived based on the resource assignment information to the uplink control channel.

34. The transmission method as claimed in claim 33, wherein the orthogonal code sequence to be used in the uplink control channel comprises an orthogonal code sequence for a cyclic shift amount individually indicated from the base station apparatus to the user apparatus, different cyclic shift amounts being assigned to different user apparatuses.

35. The apparatus transmission method as claimed in claim 33, wherein the uplink control channel includes one or more unit blocks including a sequence resulting from multiplication of a uniform factor with all chips of an orthogonal code sequence for a cyclic shift amount derived based on an assignment number indicated in a downlink control channel, different cyclic shift amounts being assigned to different user apparatuses, and the uplink control channel is transmitted in a dedicated frequency band derived based on the assignment number indicated in the downlink control channel.

36. The transmission method as claimed in claim 33, wherein the correspondence is set to define the number of multiplexed users assignable to each of a first band and a second band in the dedicated band in accordance with a code division multiplexing scheme.

* * * * *